(12) United States Patent
Zipprich

(10) Patent No.: US 12,527,657 B2
(45) Date of Patent: Jan. 20, 2026

(54) APPLICATION NOZZLE FOR DISCHARGING A DENTAL ACTIVE SUBSTANCE IN THE ORAL CAVITY OF A PATIENT, AND ACTIVE SUBSTANCE APPLICATOR HAVING SUCH AN APPLICATION NOZZLE

(71) Applicant: GALVOSURGE DENTAL AG, Widnau (CH)

(72) Inventor: Holger Zipprich, Malchen (DE)

(73) Assignee: GALVOSURGE DENTAL AG, Widnau (CH)

( * ) Notice: Subject to any disclaimer, the term of this patent is extended or adjusted under 35 U.S.C. 154(b) by 0 days.

(21) Appl. No.: 19/099,907

(22) PCT Filed: Aug. 1, 2023

(86) PCT No.: PCT/EP2023/071323
§ 371 (c)(1),
(2) Date: Jan. 30, 2025

(87) PCT Pub. No.: WO2024/028344
PCT Pub. Date: Feb. 8, 2024

(65) Prior Publication Data
US 2025/0255709 A1    Aug. 14, 2025

(30) Foreign Application Priority Data

Aug. 3, 2022  (DE) ...................... 10 2022 119 523.6
Oct. 7, 2022  (DE) ...................... 10 2022 210 641.5

(51) Int. Cl.
*A61K 6/69*   (2020.01)
*A61C 19/06*  (2006.01)
*A61M 3/02*   (2006.01)

(52) U.S. Cl.
CPC .............. *A61C 19/063* (2013.01); *A61K 6/69* (2020.01); *A61M 3/0279* (2013.01)

(58) Field of Classification Search
CPC ...... A61C 19/063; A61C 19/066; A61K 6/69; A61K 6/50; A61K 6/52; A61K 6/56; A61M 3/0279; A61M 3/0283
(Continued)

(56) References Cited

U.S. PATENT DOCUMENTS 7,530,808 B2    5/2009  Cao et al.
8,083,103 B2 *  12/2011 LaFlamme ......... B65D 81/3261
                                                222/145.5
(Continued)

FOREIGN PATENT DOCUMENTS

CN    101204599 A    6/2008
CN    105636547 A    6/2016
(Continued)

*Primary Examiner* — David J Walczak
(74) *Attorney, Agent, or Firm* — S. J. Intellectual Property Limited

(57) ABSTRACT

An application nozzle for applying dental active substances in the oral cavity of a patient comprises a nozzle body extending flat in a longitudinal direction from a connection region towards a free treatment end. The nozzle body tapers in cross-section towards the treatment end and integrates at least two media channels extending independently from the connection region to the free treatment end. The nozzle enables controlled delivery of multiple dental active substances simultaneously through separate channels while maintaining precise application geometry. The tapered design facilitates access to confined oral cavity areas and enhances treatment effectiveness. An active substance applicator incorporating such application nozzle provides improved dental treatment delivery compared to conventional single-channel applicators.

22 Claims, 22 Drawing Sheets

Figure 1:
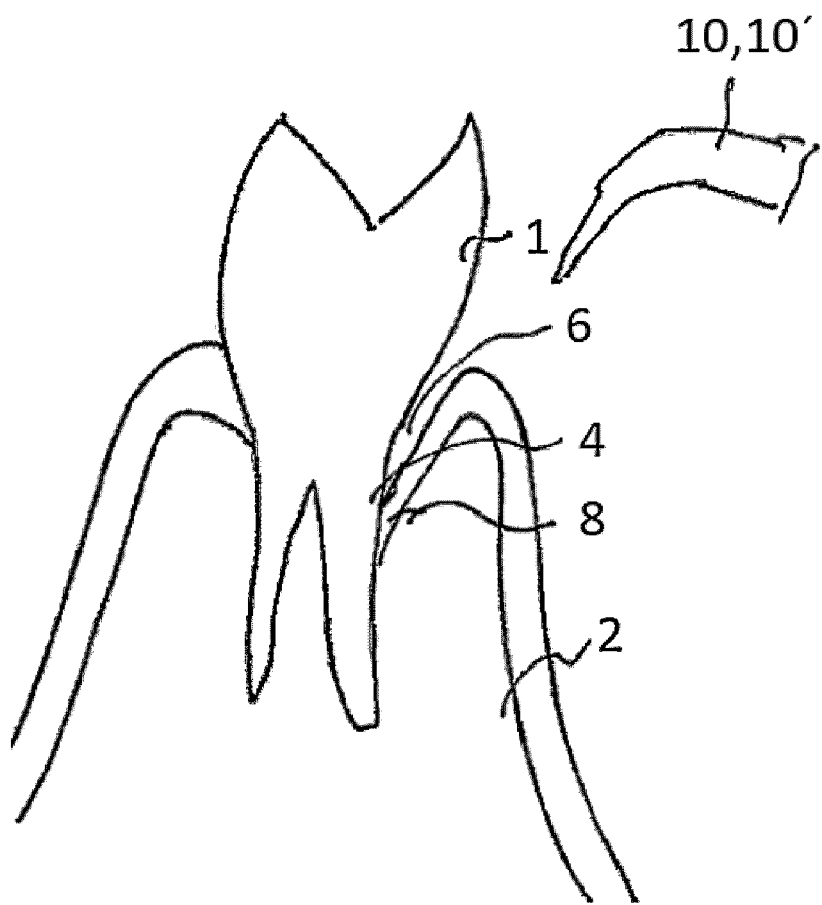

(58) Field of Classification Search
USPC ............... 222/129, 135, 137, 143, 145.5
See application file for complete search history.

(56) References Cited

U.S. PATENT DOCUMENTS

| | | |
|---|---|---|
| 2005/0202365 A1 | 9/2005 | Cao et al. |
| 2006/0072858 A1* | 4/2006 | Kurosawa ........... B29C 66/8161 383/44 |
| 2008/0145814 A1 | 6/2008 | Pichat et al. |
| 2008/0230298 A1 | 9/2008 | Buch et al. |
| 2017/0008706 A1 | 1/2017 | Dugat |
| 2019/0015180 A1 | 1/2019 | Demarest et al. |

FOREIGN PATENT DOCUMENTS

| | | |
|---|---|---|
| CN | 107920882 A | 4/2018 |
| DE | 3587725 T2 | 4/1994 |
| DE | 29923938 U1 | 7/2001 |
| DE | 10117385 A1 | 10/2002 |
| DE | 69735642 T2 | 9/2006 |
| DE | 112008002651 T5 | 10/2010 |

* cited by examiner

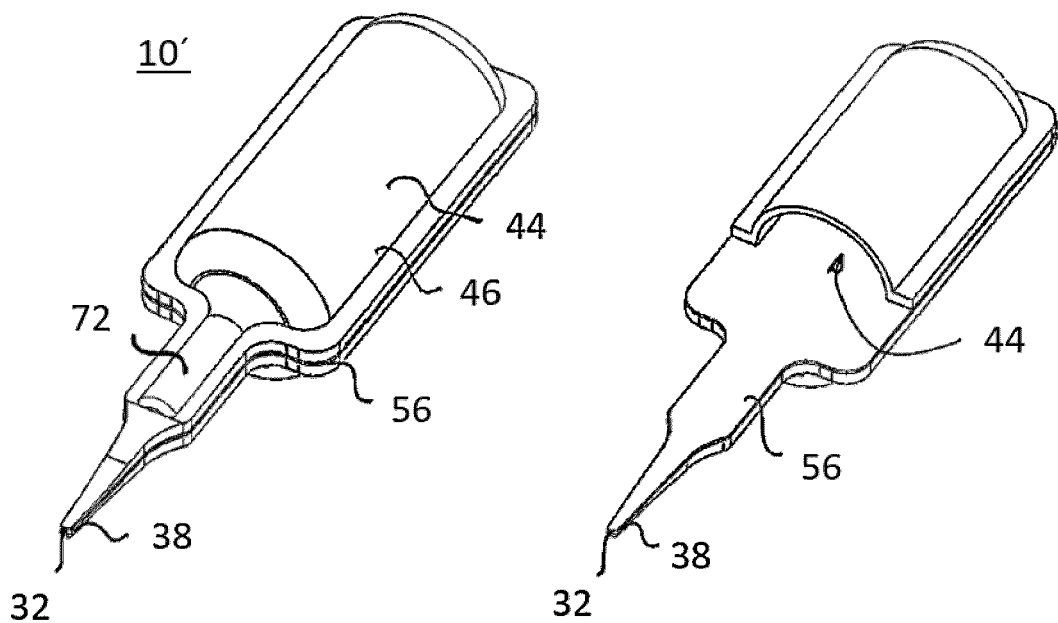
Fig. 17a
Fig. 17b
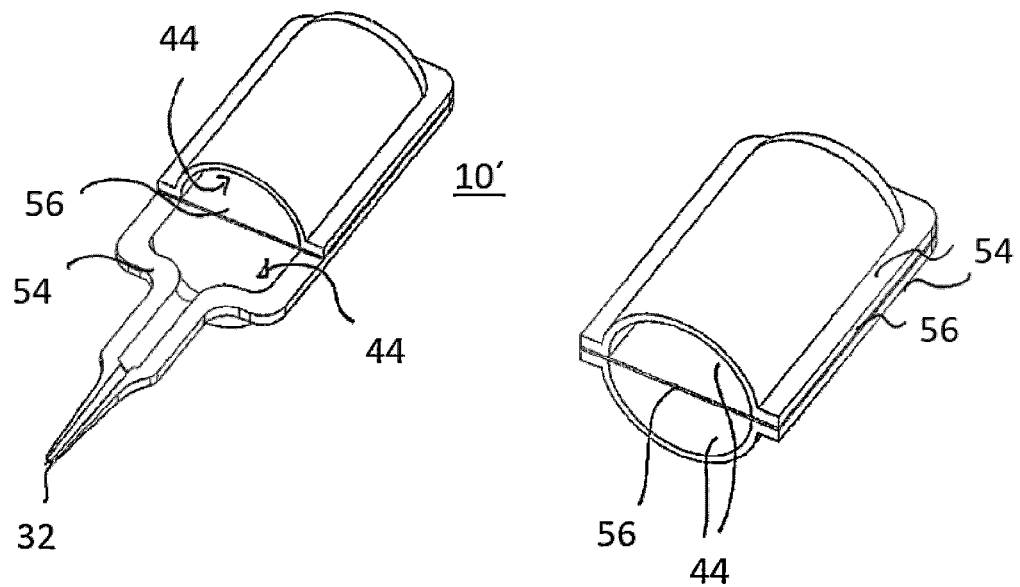
Fig. 17c
Fig. 17d

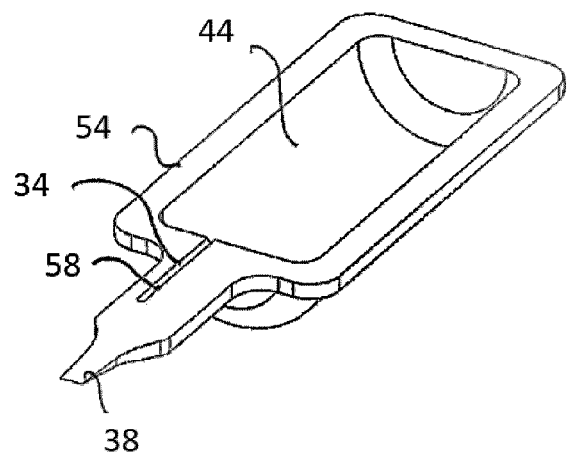
Fig.19a
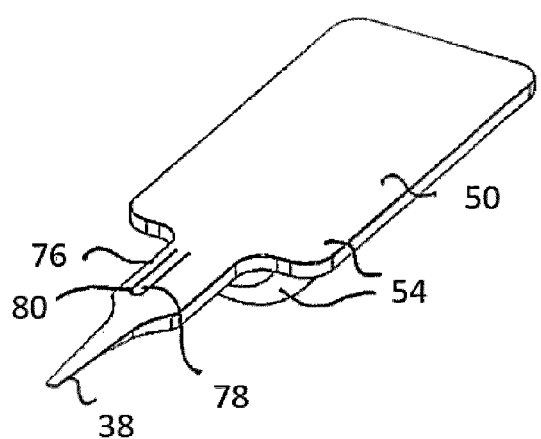
Fig. 19b
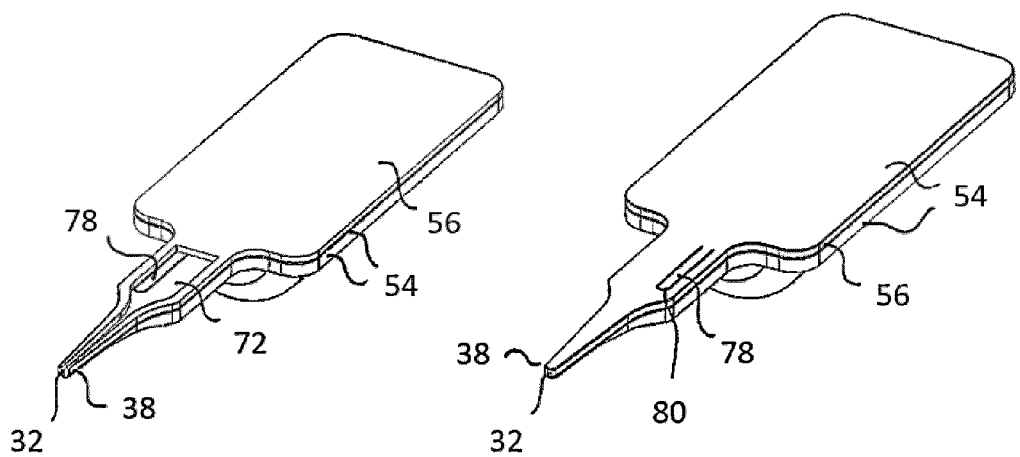
Fig. 19c
Fig. 19d
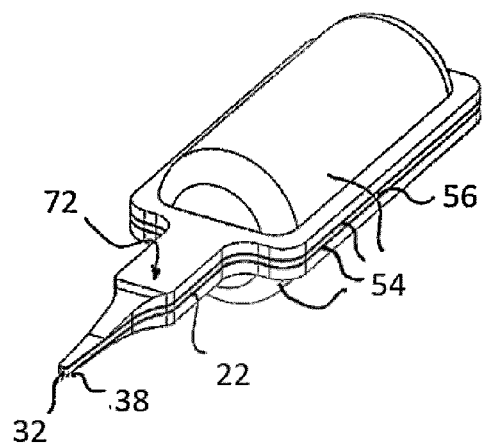
Fig. 19e

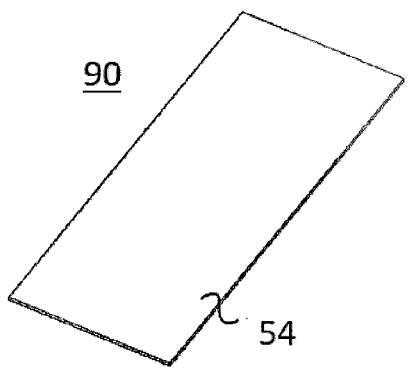
Fig. 20a
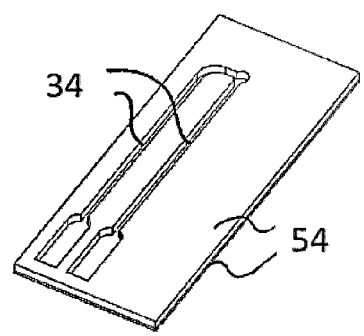
Fig. 20b
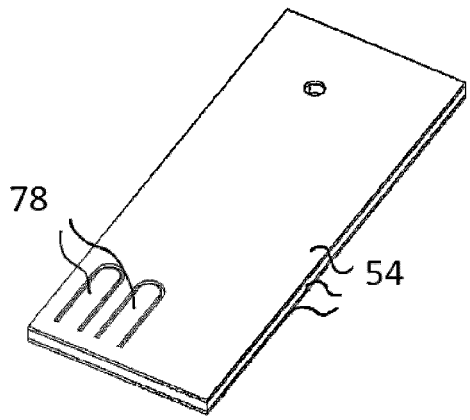
Fig. 20c
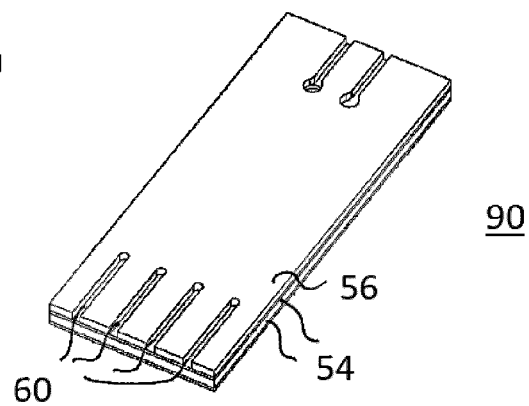
Fig. 20d
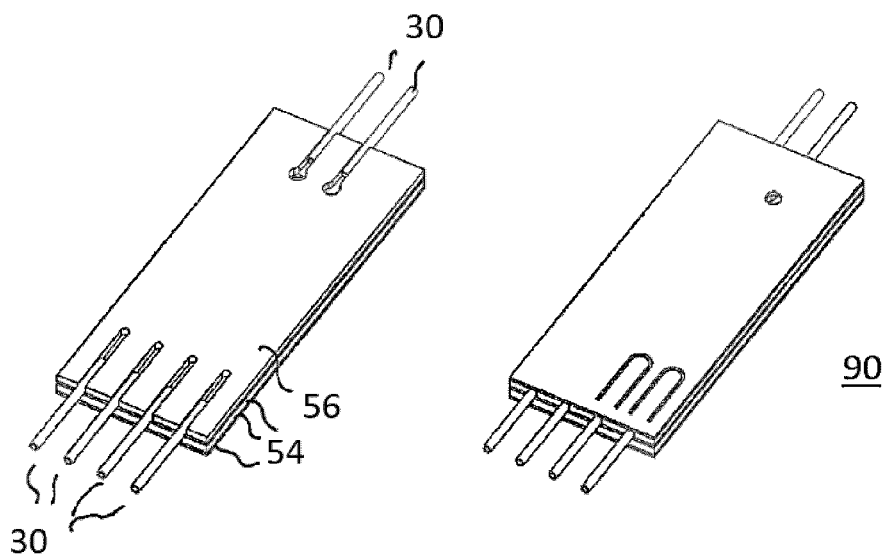
Fig. 20e
Fig. 20f

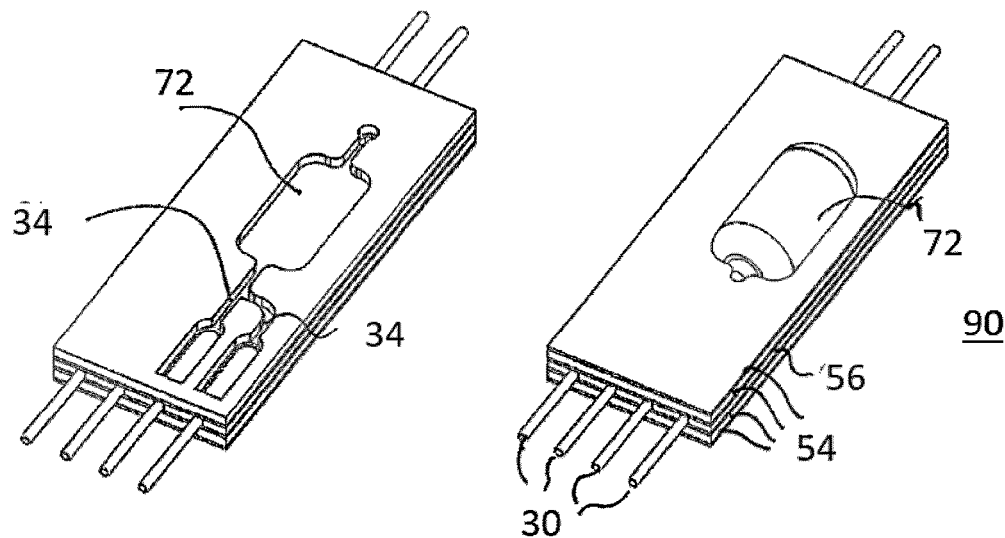
Fig. 20g
Fig. 20h
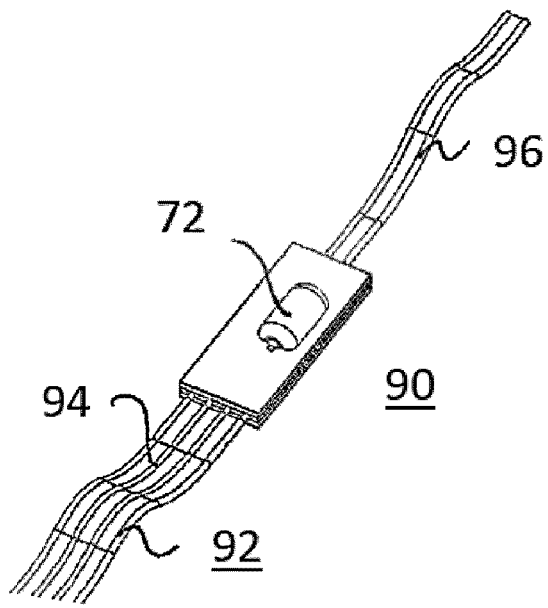
Fig. 21

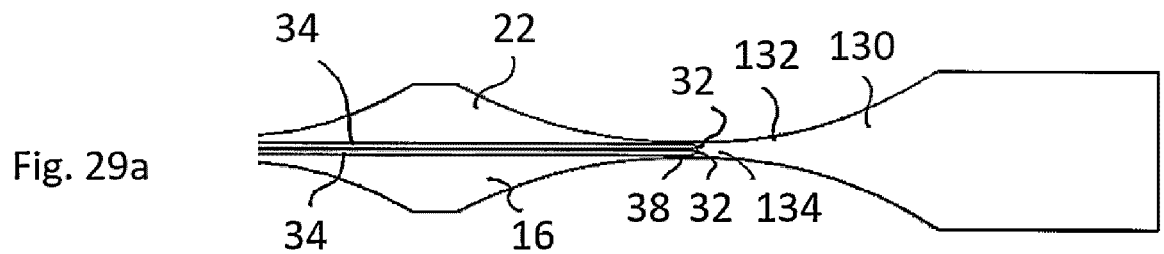
Fig. 29a
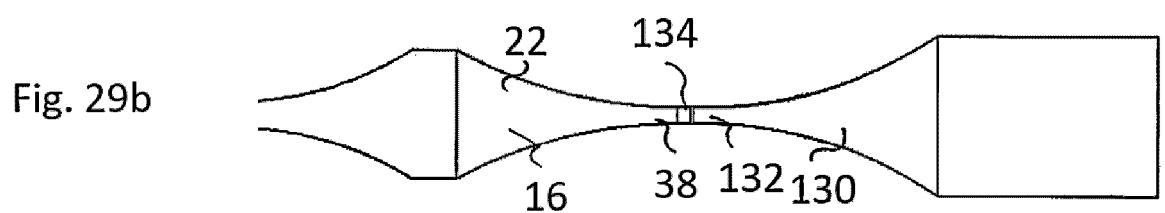
Fig. 29b
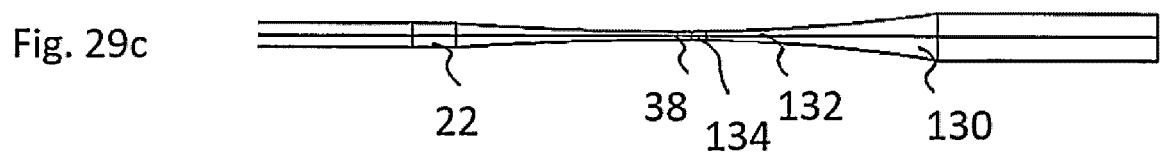
Fig. 29c
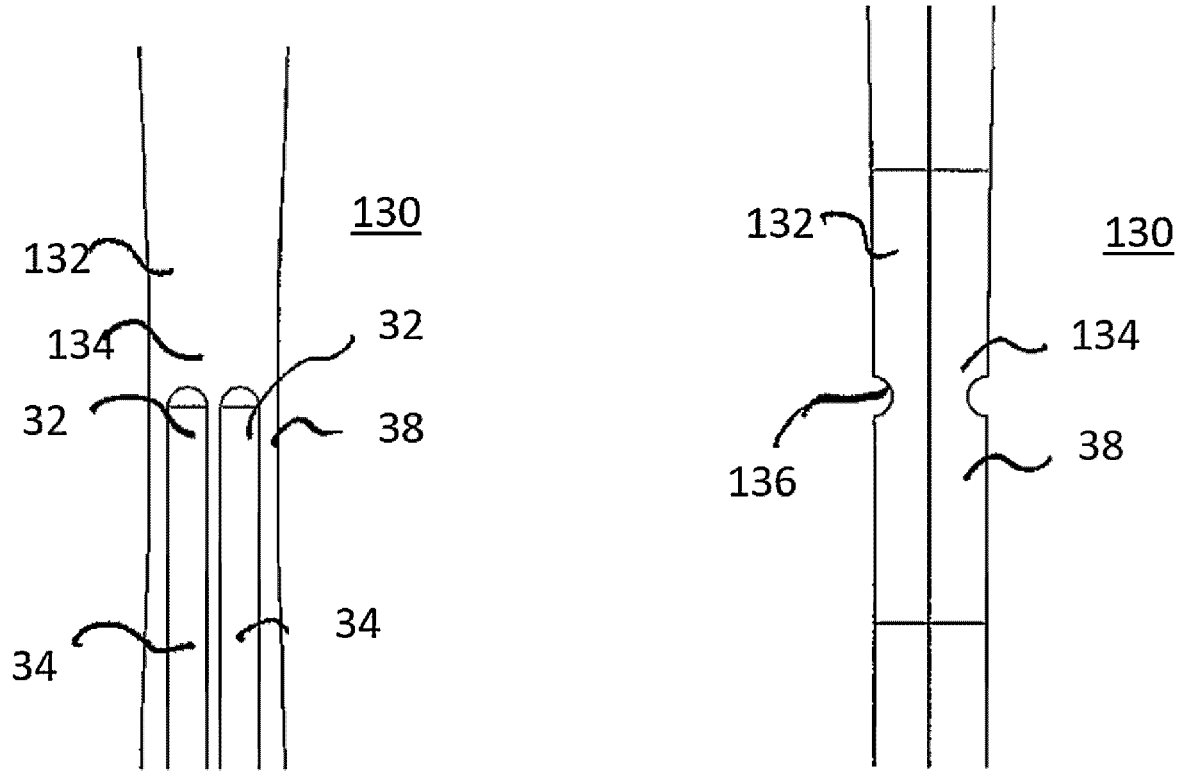
Fig. 30a
Fig. 30b

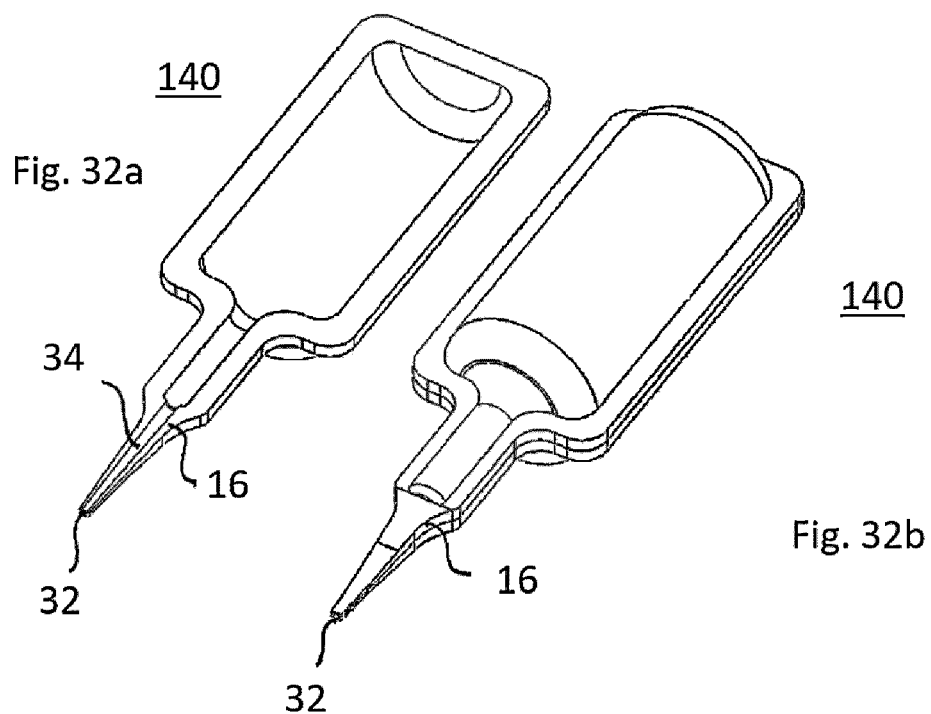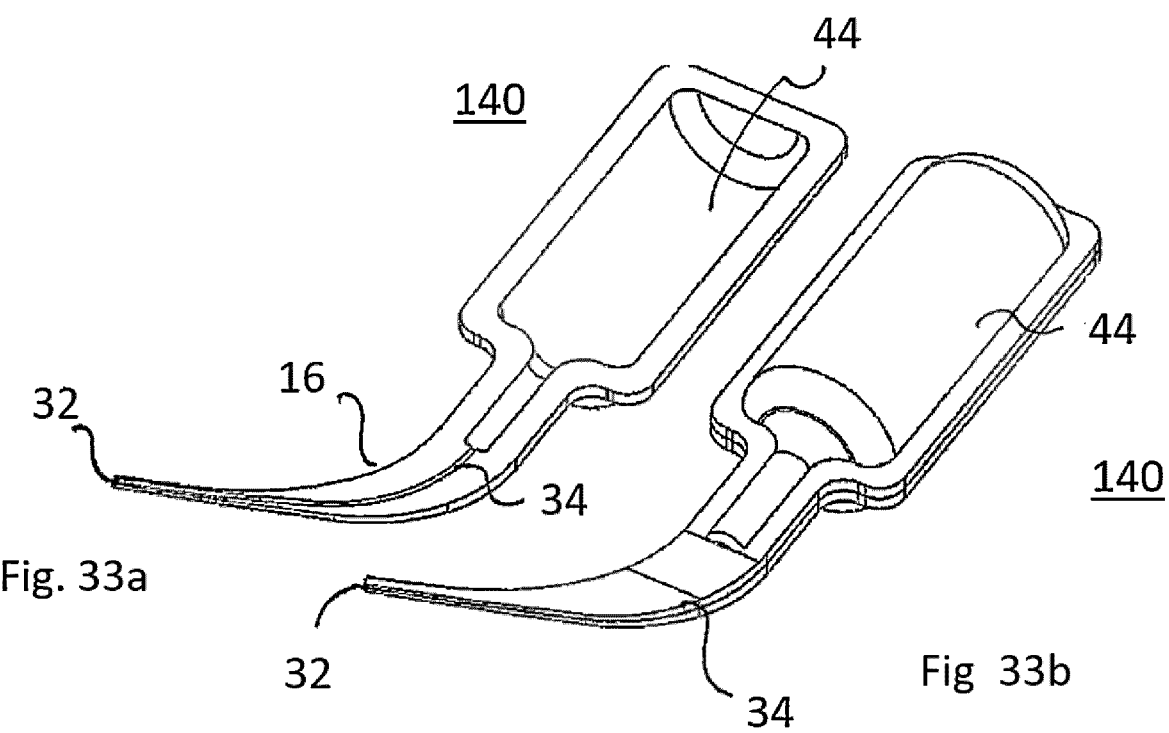

APPLICATION NOZZLE FOR DISCHARGING A DENTAL ACTIVE SUBSTANCE IN THE ORAL CAVITY OF A PATIENT, AND ACTIVE SUBSTANCE APPLICATOR HAVING SUCH AN APPLICATION NOZZLE

The invention relates to an application nozzle for applying a dental active substance in the oral cavity of a patient. It further relates to an active substance applicator with such an application nozzle.

In a variety of situations during dental treatment or pre- or post-treatment care, there is a need to accurately and precisely place a dental agent, such as a rinsing agent, disinfectant, medication or similar, in the patient's mouth. This may involve dental care measures or therapeutic measures, for example as part of pre- or aftercare, for example as part of periodontal treatment. In general, there is a desire to provide a simple application instrument that makes it easy to administer the product precisely in the patient's mouth. In view of the fact that, in addition to therapeutic measures, prophylactic measures or care measures should also be made possible, the component intended for the actual administration in the patient's mouth, i.e. the so-called application nozzle, should in particular also be simple and inexpensive to manufacture for such an application instrument and thus also suitable for large quantities. Furthermore, such an application system should also be easy and reliable to use for users who are not medically trained, especially in the context of self-treatment, for example like a toothbrush in terms of simplicity.

Furthermore, especially in the dental care or pre- or aftercare sector, there is a desire to be able to generate a particularly intensive rinsing effect in particularly affected areas such as dental pockets, especially in order to remove food residues or impurities such as biofilms or their excretions with high efficiency and thus keep the corresponding bacterial or germ infestation particularly low.

The invention is now based on the task of providing an application nozzle for applying a dental active ingredient in the oral cavity of a patient, which takes these aspects into account. Furthermore, an active substance applicator suitable in particular for use by private individuals is to be specified.

With regard to the application nozzle, this task is solved according to the invention with a nozzle body into which at least two media channels extending independently of one another from a connection area to a free treatment end are integrated.

In one embodiment, which is regarded as independently inventive, the media channels each open into an application opening on the outlet side. In a further embodiment of the application nozzle, which is regarded as independently inventive, the said task is solved in accordance with the invention with a nozzle body into which at least two media channels are integrated which extend independently of one another from the connection region to a mixing point and converge in the latter, the mixing point being connected on the outlet side via a further media channel to an application opening provided at the free treatment end.

In particular, the mixing point and/or the additional media channel opening into the application opening are also integrated into the nozzle body.

Advantageous embodiments of the invention are the subject of the subclaims. Further and/or alternative advantageous embodiments of the invention as well as further embodiments regarded as independent inventions also result from the description of the figures.

According to one aspect of the invention, the application nozzle is thus intended to provide two (or more) supply channels which are kept separate from one another on the media side and via which different active ingredients can be applied without mixing and independently of one another in a common spatial area in the vicinity of the free treatment end. The invention is based on the consideration that such a design allows not only active ingredients per se, but also reactions between two active ingredients to be used in a targeted manner in a localized position in the oral cavity, for example in a tooth pocket. This means that not only the active ingredients themselves, but also the reaction processes between them and any reaction products released in the process can be used for the purpose of treatment and for defined objectives.

For example, in accordance with an aspect of the invention which is regarded as independently inventive, active substances or components can be brought together directly at the application site, which react with each other to form bubbles, whereby the resulting gas bubbles can be used to discharge and carry away impurities, food residues and the like. Such a concept is therefore suitable for use in a targeted care and cleaning program for the teeth, for example, in which the tooth pockets are also treated and cleaned. For example, and in accordance with an aspect of the invention which is regarded as independently inventive, the active ingredients or components could be a hydrogen carbonate, preferably a sodium or potassium hydrogen carbonate, on the one hand, and an acid, preferably a carboxylic acid (e.g. citric acid or lactic acid), on the other hand. These are then applied together, come into contact with each other at the application site and react to form bubbles ($CO_2$ formation). This effect could be particularly beneficial for cleaning or rinsing purposes, for example.

In order to enable the use of reaction effects between two or more active substances or components, as envisaged according to one aspect of the invention, particularly reliably and also precisely in a selected application area, for example a tooth pocket, the outlet or application openings assigned to the two media channels are advantageously positioned as close as possible to one another, so that the intended mixing of the components takes place reliably and specifically in the spatial area selected by the user by positioning the treatment tip. Thus, in an advantageous embodiment, the application openings assigned to the two media channels are at least 0.01 mm and at most 10 mm, preferably at least 0.1 mm and/or at most 2 mm, in a particularly advantageous embodiment at most 0.1 mm to 0.6 mm, apart from each other.

According to an alternative aspect of the invention, which is considered to be inventive in its own right, two (or more) feed channels, which are kept separate from each other on the media side, are to be provided via the application nozzle, via which different active ingredients can be dispensed without mixing and separately from each other into a common spatial area, namely a mixing point integrated into the nozzle body. This allows the active ingredients to be mixed in a controlled manner and under adjustable boundary conditions. This allows targeted use to be made of effects triggered by the mixing, for example reactions between the active ingredients. In particular, it may be possible to specifically trigger a reaction which, starting from originally liquid active ingredients, is accompanied by gas formation and a corresponding significant increase in pressure. For example, and according to one aspect of the invention, the active ingredient could be a hydrogen carbonate, preferably potassium, sodium or calcium hydrogen carbonate, particularly preferably sodium hydrogen carbonate, on the one hand, and an acid/carboxylic acid (e.g. malic acid, citric acid, lactic acid, etc.) on the other hand, preferably each in aqueous solution and in a concentration suitable for the intended handling. These are then fed together to the mixing point, where they come into contact with each other and react to form bubbles ($CO_2$ formation). As a result of this bubble-forming reaction, a very high pressure can be generated in the mixing point without active external influence, so that the medium emerges from the mixing point at a comparatively high pressure and, as a result, as a directed jet from the application opening of the nozzle body. This effect could be used particularly effectively for cleaning or rinsing purposes, for example, whereby the generation of a directed jet under high pressure is particularly useful.

In the scope of this aspect, the invention is thus based on the consideration that a directed, pressurized media jet should be provided to enable the desired particularly high cleaning or rinsing effect. This is possible in a particularly simple "self-acting" design without the need for external intervention due to the aforementioned design, which enables reactions between two active substances to be triggered specifically in a localized position in the nozzle body. This means that not only the active ingredients themselves, but also the reaction processes between them and any reaction products released in the process can be used for the purpose of treatment and for defined targets. In particular, by suitably shaping the chamber geometry and/or the geometries of the media channels and possibly providing further components such as valve flaps, it is possible, according to one aspect of the invention, to specifically specify the pressure ratios or other parameters in the resulting media jet.

Such a concept is therefore suitable for use in a targeted care and cleaning program for the teeth, for example, in which the tooth pockets are also treated and cleaned.

Advantageously, the mixing point is designed as a mixing chamber towards which the media channels run and into which they open. The mixing chamber can be specifically adapted to the desired reaction dynamics, in particular by selecting a suitable geometry or volume; advantageously, it has a volume of at most 1000 $mm^3$, preferably of at most 500 $mm^3$, particularly preferably of at most 100 $mm^3$ In view of the intended use of the application nozzles in the dental care and prophylaxis sector, in order to enable the manufacture of an enormously large number of such application nozzles and thus mass production, a particularly suitable design is advantageously selected for this purpose, which allows the provision of a functionally reliable application concept even when using comparatively inexpensive materials. In order to take this into account, a foil material is advantageously provided as the base material for the manufacture of the base body of the nozzle, which can be built up by laminating or welding a plurality of foil layers on top of each other to form a suitable composite body and can also contain a storage container and/or the media channels. The base body or nozzle body, in which the media channels, each opening into an application opening on the outlet side, are arranged, is thus formed in this advantageous embodiment, which is regarded as independently inventive, by a layered body constructed as a laminate or as a welded joint from a plurality of pieces of film.

The media transport channels provided for transporting the active ingredient to be administered to the intended delivery point in this composite body, which open into the mixing chamber of the composite body on the outlet side, can be provided by recesses made in the respective film. In particular, the use of a film-based technology with subsequent lamination or welding enables enormous flexibility in the design and insertion of such media channels, as the free or empty spaces required for these within the composite body can be created in a variety of ways and geometries by suitable shaping in the respective film. Shaping is advantageously carried out by punching, lasering or embossing, which is particularly preferred; alternatively, however, processing by milling or etching (in the case of wet-chemically dissolvable film material) can also be provided. The foil into which the cut-outs are made can preferably be attached to a carrier foil, which in turn can be provided as part of the foil stack or can be removed later after making the cut-outs. During embossing, or in particular hot embossing, a dual-extruded film can also be used, for example, into which the media channels are inserted using a hot stamp or roller.

The media channels and/or the mixing chamber can be produced in particular by using lamination, welding or embossing technology, for example by producing a central film with corresponding cut-outs and then laminating or welding them together on the top and bottom with a continuous film to form a composite body in the form of a film sandwich, or by laminating or welding two symmetrical embossings onto each other.

Advantageously, polyamide is provided as the base material for the films or film pieces; alternatively, however, another suitable film material such as PVC, PP or PE or even a combination of different film materials can be considered favorable. According to one aspect of the invention, the choice of material is made in particular with regard to the fact that the application nozzle should also be suitable for use by trained medical personnel, for example in connection with treatment by a dentist, but on the other hand also for use by generally not particularly trained private persons, in particular the patients themselves in the context of dental care. It is particularly preferred that the film material is selected with regard to its material properties, such as in particular its rigidity or strength, in such a way that the rigidity of the laminate or composite body formed from the film pieces is not too great and thus injuries in the oral cavity are largely excluded.

In a particularly advantageous embodiment, which is regarded as independently inventive, the nozzle body is constructed from at least three film layers which differ in their material properties and are functionally adapted to different specifications. In particular, according to one aspect of the invention, a central film layer arranged between two adjacent film layers can be formed from a harder film material, i.e. in particular with a different Shore hardness or modulus of elasticity, than the two adjacent film layers. This means that the central film layer can define the contour or spatial shape of the nozzle body in the manner of a support structure, whereas the comparatively softer outer film layers can be designed to be flexible and deformable and thus significantly reduce the risk of injury in the event of contact with the nozzle body, for example of the oral mucosa. If the nozzle body, hose and storage container are all in one, in a particularly advantageous embodiment the middle and stiffer film is only attached in the nozzle body.

According to one aspect of the invention, the nozzle body is composed of at least three foil layers, in each of which a light guide or a light guide foil is integrated. This structure can be used for the lateral detection of teeth or soft tissue in accordance with an approach that is regarded as independently inventive. In particular, it is intended to introduce white light into the foil package and thus into the application area, for example in the tooth pocket, through a centrally arranged light guide. This is reflected there, and the reflected light can then be returned in light guides arranged on the outside. If the light is reflected by tooth or implant material, the proportion of red in the reflected light is lower than if it is reflected by soft tissue. By comparing the red components in the reflected light, it is therefore possible to recognize which side surface of the nozzle body is facing the tooth or implant and which is facing the soft tissue. Using this knowledge, the media channels located on both sides of the central foil can then be supplied as required. A distinction between tooth and implant can also be made by determining the difference in brightness: the comparatively brighter reflected light is assigned to the tooth; the comparatively darker light is assigned to the implant.

According to a further aspect of the invention, which is regarded as independently inventive, the outer layer films of the film packet are advantageously colored, wherein a first outer film is colored white and the second outer film is colored red. This embodiment serves to facilitate the work of the user with regard to the correct alignment of the application nozzle: the red-colored outer foil should point towards the soft tissue or gums and the white one towards the tooth when used correctly. In such an embodiment, in an advantageous further development, only the white side, i.e. the side to be aligned towards the tooth, is provided with application openings. This ensures, for example, that a disinfectant or treatment agent is only applied to the tooth and not to the soft tissue.

According to one aspect of the invention, the media channels are formed by the respective recess in a central film, which is laterally bounded by the respective side edges. The respective media channel is then bounded on the top and bottom by the corresponding laminated or welded-on, continuous base or cover film. In order to be able to safely and reliably provide comparatively large free cross-sections of the respective media channels with correspondingly wide recesses in the middle or central film, which are also suitable for the passage of larger quantities of active substances, a number of the media channels are provided with integrated spacers in an advantageous embodiment which is considered to be inventive in its own right.

In a particularly advantageous embodiment, which is also regarded as independently inventive, the application nozzle is also designed in terms of its geometric configuration and dimensions for the intended use for the precise introduction of active substances into the oral region of a patient or also for rinsing in the oral region. Advantageously, particular consideration is given to the fact that application into the interdental spaces or pockets of the patient's teeth could also be intended, especially during dental care measures. According to one aspect of the invention, an application nozzle particularly suitable for this purpose has a nozzle body constructed as a laminate of the foil pieces with a total thickness of 0.3-2 mm, preferably of 0.5-1.5 mm, particularly preferably of 0.7-1.2 mm. Corresponding to this, the pieces of film forming the laminate advantageously each have a film thickness of 50-500 µm, preferably of 80-350 µm, particularly preferably of 100-250 µm.

Alternatively or additionally, according to one aspect of the invention, the shape of the application nozzle is also particularly favorably adapted to the aforementioned applications, i.e. the precise application of an active ingredient, for rinsing in the oral cavity and/or for dental care in general. For this purpose, its nozzle body can extend in a longitudinal direction from a connection side towards a free treatment end, whereby it tapers in its cross-section towards the treatment end. It thus approximately assumes the contour of a treatment tip, so that handling is particularly facilitated in the comparatively cramped situation in the oral cavity. According to one aspect of the invention, the design of the application nozzle can thus be provided as an essentially flat component. This does not mean that the application nozzle could or should be two-dimensional; rather, it means that the application nozzle or the base body forming it should be a body which extends essentially along a basal plane or ground plane, but which nevertheless has a certain thickness in the third spatial direction. Viewed in cross-section, however, this also means that the lateral extension of the base body in the basal plane is significantly greater than the thickness in the direction perpendicular to it. For the application, this means that the free or treatment end of this basic body can be inserted comparatively easily into the aforementioned tooth pockets, for example by aligning the basal plane of the basic body essentially parallel to the outer surface of the tooth.

In particular, the base body can have a sword- or blade-like shape, especially in the area of the treatment end, with which both the tooth pockets and the spaces between the teeth can be easily reached. A laterally radiating application opening also ensures that undercuts on the tooth surfaces, for example due to concave segments in the area between the teeth, can be easily and reliably treated with medium.

Preferably, the application opening or the application openings and thus the "double nozzle" formed by them are arranged in an outflow area of the nozzle body located in the area of the treatment end. With regard to the outflow direction from the respective application opening, this can be designed for an outflow of the medium from the application opening that is essentially parallel to the longitudinal direction of the nozzle body, or also for an oblique or lateral outflow. The opening area of the respective media channel can be aligned in a straight line or can also be curved or angled. Furthermore, the nozzle body preferably has a contour shaped like a triangle in plan view, which can also be designed as a type of curved triangle for optimized application.

In addition to the cut-outs that form the media channels, it is also possible to insert an embossing that acts as a media channel.

According to a further aspect of the invention, which is considered to be inventive in its own right, the application nozzle is specifically designed for use in the context of dental care, whereby reliable rinsing, which is kept simple for the user, can also be particularly important for zones which are difficult to access, such as the tooth pockets. In order to particularly promote this, at least one further media channel, which is designed as a suction channel, is advantageously provided in addition to a media channel provided as an application media channel that opens into an application opening on the outlet side. The application media channel can then be used for the targeted supply of the rinsing medium, for example into the tooth pocket, whereby the particles, food residues or soiling discharged as a result of the rinsing can be specifically removed by means of the suction channel(s). This can be very useful in particular during dental treatment, whereby the suction channel according to one aspect of the invention can be connected to a saliva ejector, the suction device on the patient's chair, a surgical suction unit or another external suction device.

According to a further aspect that is regarded as independently inventive, the application nozzle has, in addition to the media channels, a pressure channel that is also integrated into the nozzle body and connected to the mixing point. In particular, this can be connected or connectable to an external pressure source, for example a pump, so that the mixing point can be additionally pressurized in a targeted manner to support the pressure build-up during the application of the medium. The pressurized medium can be air, water, or a mixture thereof, possibly also mixed with powder or particles. The pressurization is advantageously pulsed or intermittent, so that a particularly intensive application of the medium can be generated as required.

In an advantageous further development, the application nozzle as described above is designed as a disposable or single-use product and is therefore intended for single use only.

In a manner regarded as independently inventive, the nozzle body, in an otherwise largely identical design to that described above, can also be designed as an intermediate piece instead of an application nozzle, in which the introduction of the media into the patient's oral cavity does not take place via application openings arranged at the treatment end of the nozzle body, but via an independent delivery part, for example a hose package, a treatment snorkel or the like. In such an embodiment, the actual application part can be suitably connected to the outlet area of the nozzle body, whereby a pressurized treatment medium generated in the mixing point or, in particular, in the mixing chamber can be directed to the intended application site in the patient's mouth via a corresponding pressure line provided in the application part. Accordingly, suitable additional media channels can be provided in the dispensing part for other media carried in the nozzle body, such as individual media, which are only to be brought into contact with each other at the dispensing point in the patient's oral cavity.

With regard to the active ingredient applicator, the stated task is solved with an application nozzle of one of the designs described above, whereby each of the two media channels opening into an outlet opening or into the mixing chamber is connected on the media side to a separately assigned active ingredient chamber. This design enables the use envisaged by the invention in that the active ingredients held in the active ingredient chambers can be applied separately and independently of one another via the application openings at the intended position in accordance with one embodiment of the invention and only mixed there or, in accordance with an alternative embodiment of the invention, fed into the mixing chamber for mixing. The embodiment can be provided as a cartridge with a nozzle for manual squeezing, as a hand-held device analogous to an electric toothbrush or also as a stand-alone device with a hose to the handpiece/mouthpiece, possibly also with a light.

The active ingredient applicator can comprise the application nozzle as a separate, independent component that is connected to the active ingredient chambers via suitable connection points. These could be installed in a fixed position or already connected to the application nozzle at the manufacturing stage as a separate component, so that the application nozzle is delivered to the user together with the already connected active ingredient chambers as a pre-assembled system. In this way, for example, the portioned, pre-dosed delivery of the active ingredient to the user is possible, whereby in particular all specifications from the hygiene area, for example necessary disinfection or sterilization measures, can be easily complied with by using the usual concepts for this, such as corresponding outer packaging. The application nozzle can be designed as a replaceable, disposable part, whereby a new, unused nozzle is first connected to the actual apparatus for use.

According to one aspect of the invention, however, the active ingredient applicator can also have an integrated design in the sense that the active ingredient chambers are integrated together with the nozzle body in a base body and, if necessary, together with the connecting hose. In such a design, the "application nozzle" forms the end section of this common base body facing the end of the treatment and is therefore not a physically independent component. The design of the common base body as a multilayer film body or laminate of the design described above is considered to be particularly advantageous in this design. By suitably shaping the film layers or pieces of film, both the media channels and the active ingredient chambers and, if necessary, the connecting elements can be integrated into the body, whereby the suitable spatial configuration can be selected as required by utilizing the film properties and the resulting flexibility. In particular, the applicator can be designed in the manner of an ampoule, whereby the flexible properties of the respective films and the active ingredient chambers formed by these are suitable for the patient to squeeze out at home. The applicator can be provided to the patient at home or to the dentist in the same way as a toothbrush with an ampoule.

According to a further aspect of the invention, which is also regarded as independently inventive, the application nozzle can also be designed for administering pre-dosed or portioned amounts of active ingredient. For this purpose, according to one aspect of the invention, the respective active ingredient chamber is advantageously designed with an internal volume adapted to the patient dose to be administered. This can then contain a predefined dose of active ingredient, e.g. chlorhexidine for disinfection or a rinsing solution. The patient can then apply this themselves at home, whereby the design of the application nozzle enables correct positioning in the oral cavity on the one hand, and on the other hand the correct dosage of the active ingredient can be ensured by the portioned supply in the nozzle body. The active ingredient stored in the active ingredient chamber or its introduction into the active ingredient chamber can then be applied by pressing on the composite body, possibly using the material-related deformability of the foil composite body, whereby the active ingredient is pressed out through the respective media channel and the associated application opening.

Advantageously, the active ingredient chamber is closed off from the associated media channel by a sealing or closure element, so that unintentional leakage of the active ingredient is prevented. The sealing element is advantageously designed in such a way that it tears, breaks or is otherwise destroyed when pressure is exerted on the active ingredient chamber or it is separated from the application nozzle. Preferably, the film elements are laminated or welded and made extra thin by embossing, resulting in a weak point that forms a separation or tear-off point/area and thus opens the media channels. As a result of the pressure exerted or the separation, the media channel is released for the active ingredient and this can be applied.

The aforementioned design could also further improve the logistics for the provision of active ingredients overall, as self-administration by the patient would be made possible for some active ingredients or medicines in the first place.

In a particularly preferred embodiment, which is also regarded as independently inventive, a hydrogen carbonate, preferably potassium, sodium or calcium hydrogen carbonate, particularly preferably sodium hydrogen carbonate, is provided as the active ingredient in one of the aforementioned active ingredient chambers. With an application nozzle prepared and prefilled in this way, the patient or user could, for example, independently monitor and track the success of treatment in the course of so-called periodontal treatment or its aftercare. If the carbonate is applied to the affected tooth pocket using the application nozzle and an infection is present there, the carbonate interacts with the acidic environment in the tooth pocket caused by the infection to form bubbles. On the one hand, this effect of bubble formation in the pocket can be used as an indicator for the user: bubbling only occurs when the environment is acidic and there is therefore an infection in the pocket. As a result, the bubbling gives the user haptic or tactile as well as visual feedback about the presence of an infection and therefore the progress of the treatment success. In addition, the formation of bubbles in the pocket also causes additional rinsing success and thus also favors the aftercare of the treatment.

Such a concept, namely the provision of a carbonate or hydrogen carbonate as an active ingredient in an active ingredient chamber connected to an application opening via a media channel, and an active ingredient applicator constructed in this way are regarded as independently inventive, also (but not only) in an embodiment with only one media channel and/or only one active ingredient chamber, i.e. in particular without the provision of a further active ingredient, and preferably in combination with the above-mentioned aspects relating to the spatial and/or functional embodiment of the applicator components. According to an aspect of the invention which is regarded as independently inventive, such a diagnosis of the presence of inflammation can also be made by inserting a paper tip, a cotton tip, a liquid-collecting silicone element or the like into the tooth pocket and taking a sample there, which is then placed in a solution with Na or K hydrogen carbonate. This is a simple way to provide an indicator for the detection of inflammation that is suitable for use by the patient at home.

According to the above-mentioned aspect of the invention, two or more active ingredient chambers are provided, each of which is connected to at least one application opening via an associated media channel. According to one aspect of the invention, the chambers may then contain different active ingredients which, in combination or interaction with one another, trigger the desired effects. The active ingredients are then applied together when actuated by the user and mix at the application site, so that the expected interaction is triggered at the application site. For example, two active ingredient chambers could be provided, with the hydrogen carbonate in one and an acid/carboxylic acid (e.g. malic acid, citric acid, lactic acid, etc.) in the other, preferably each in aqueous solution and in a concentration suitable for the intended handling. These are then applied together, come into contact with each other at the application site and react to form bubbles. This effect could be particularly useful for cleaning or rinsing purposes, for example.

As active ingredient, one of the active ingredient chambers can be filled in particular with disodium hydrogen phosphate, sodium dihydrogen phosphate and/or sodium monohydrogen phosphate, in each case optionally also as dihydrate. Alternatively or additionally, according to one aspect of the invention, an emollient substance, for example docusate sodium, and/or an antibacterial substance may also be included, such as clove oil, CHX or $H_2O_2$.

The advantages achieved with the invention consist in particular in the fact that the provision of two or more active ingredients in separately held active ingredient chambers, which are discharged via separate media channels in a common spatial area and mixed there, enables the targeted and localized use of the reaction dynamics of the active ingredients and/or their reaction products, such as gas bubbles formed. Special care or treatment measures can be carried out in dental pockets, which are otherwise difficult to access, even by the user or patient themselves and without prior medical training. The design of the application nozzle as a film composite or laminate also means that suitable application nozzles can be provided cost-effectively and in large quantities using comparatively simple means and with enormous flexibility in terms of spatial design. This also enables or at least facilitates care in a wide range of applications, from therapeutic applications by trained personnel to preventive or care measures that the user or patient can carry out themselves.

It should also be noted that a user at home does not have sterile media, especially gases, available. In contrast, a dentist usually has access to sterile air and sterile water for rinsing the dental pockets. The mixture of at least two sterile active substances with a comparatively small volume that is now provided creates a sterile gas with a very high volume as a reaction product directly on site, i.e. already in the tooth pocket, which enables sterile rinsing of the tooth pocket even for the private user. This is particularly important for rinsing the tooth pocket by the patient himself. Furthermore, the concept according to the invention can provide a sterile gas for rinsing directly at the point of use.

By introducing a hydrogen carbonate solution into the tooth pocket, the pH value within the pocket is raised in addition to detecting an inflamed pocket. In particular, the tooth substance and the hard and soft tissue surrounding the tooth react in an inflammatory manner to a reduction in the pH value within the tooth pocket caused by a biofilm. Consequently, it is possible to make the environment within the tooth pocket, the tooth substance and/or the hard and soft tissue surrounding the tooth more favorable and to set a higher pH value, which supports the tissue regeneratively.

The reaction of hydrogen carbonates dissolved in water, such as potassium and or sodium hydrogen carbonate, with acids (e.g. malic acid, citric acid or lactic acid dissolved in water) or The reaction between the H+ ions of acids consists of the formation of the gas carbon dioxide ($CO_2$), water ($H_2O$) and the sodium salt of the acid anion (in the example sodium malate—$Na_2C_4H_4O_5$, sodium citrate—$Na_3C_6H_5O_7$ or sodium lactate—$NaC_3H_5O_3$). The fact that this chemical reaction does not produce any toxic or medically questionable substances in addition to the scavenging and gas bubble-forming carbon dioxide formation is considered to be particularly advantageous and independent with regard to the substances now provided finder.

Although ammonium hydrogen carbonate itself would be a conceivable alternative, it is already harmful to health. The reaction with an acid or carboxylic acid would also produce substances that are harmful to health. When reacting with an acid or carboxylic acid, water ($H_2O$), the beneficial and desirable carbon dioxide ($CO_2$) and the harmful and toxic ammonia ($NH_3$) are formed.

The only real alternative to potassium and sodium hydrogen carbonate is therefore calcium hydrogen carbonate, which exists exclusively in water.

This type of rinsing can of course also be used in many other medical applications on the human or animal body, due to the high sterility of the gas produced.

Figure 2:
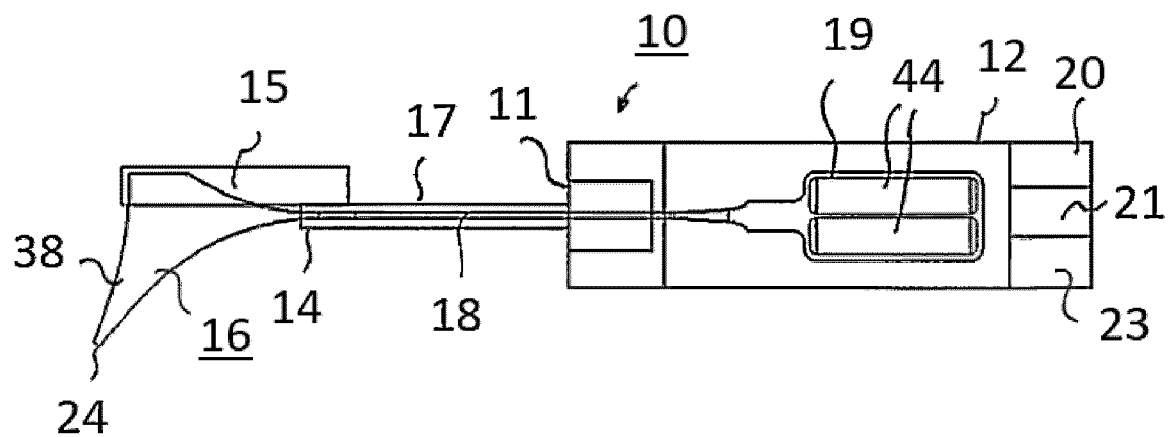
Figure 3:
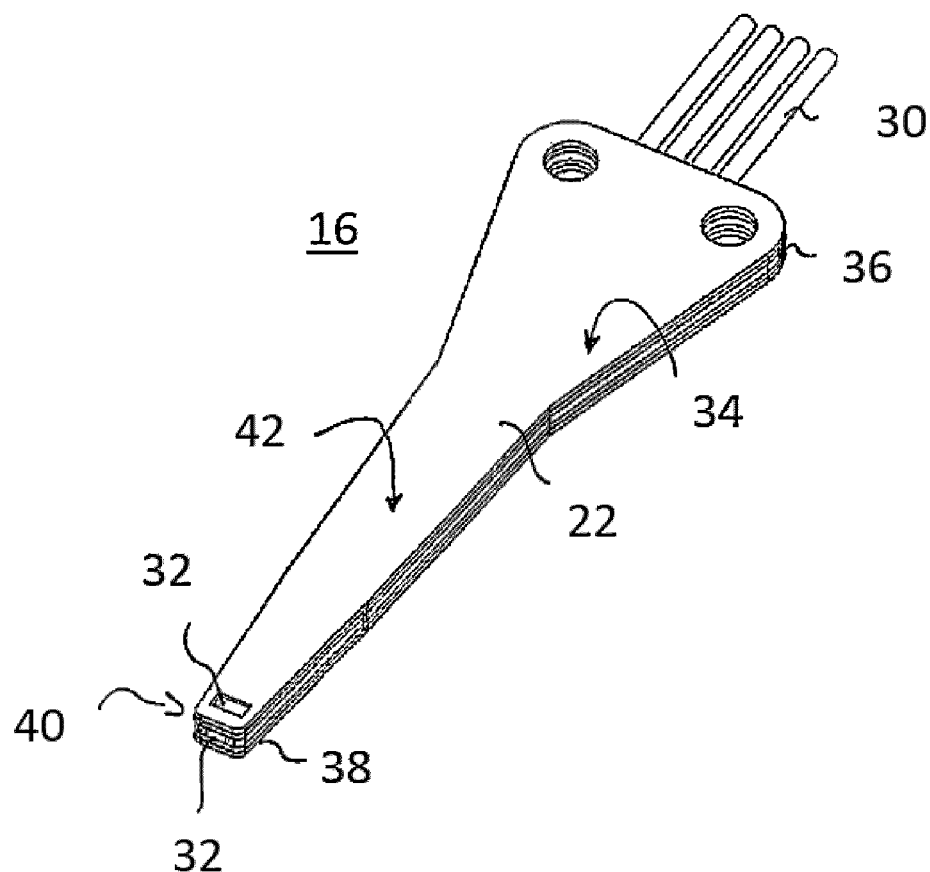
Figure 4:
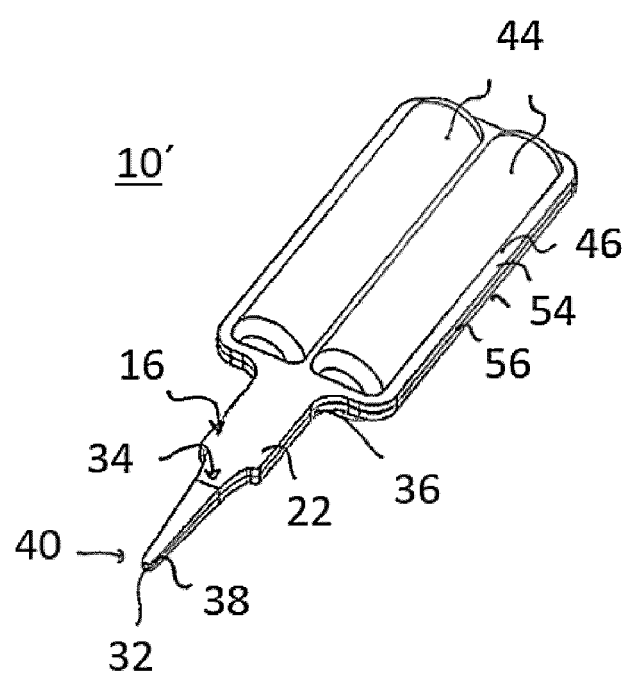
Figure 8A:
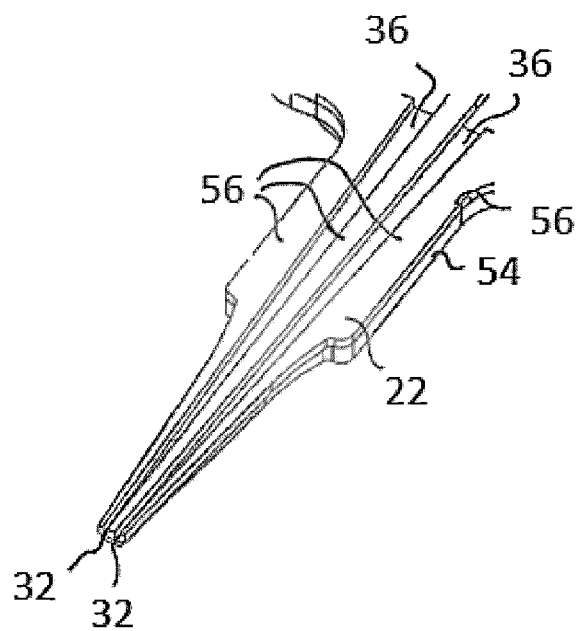
Figure 8B:
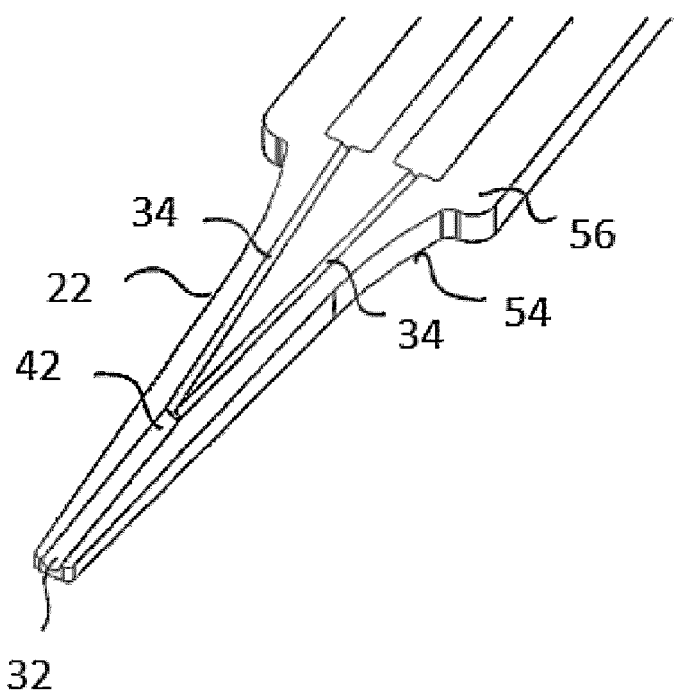
Figure 9:
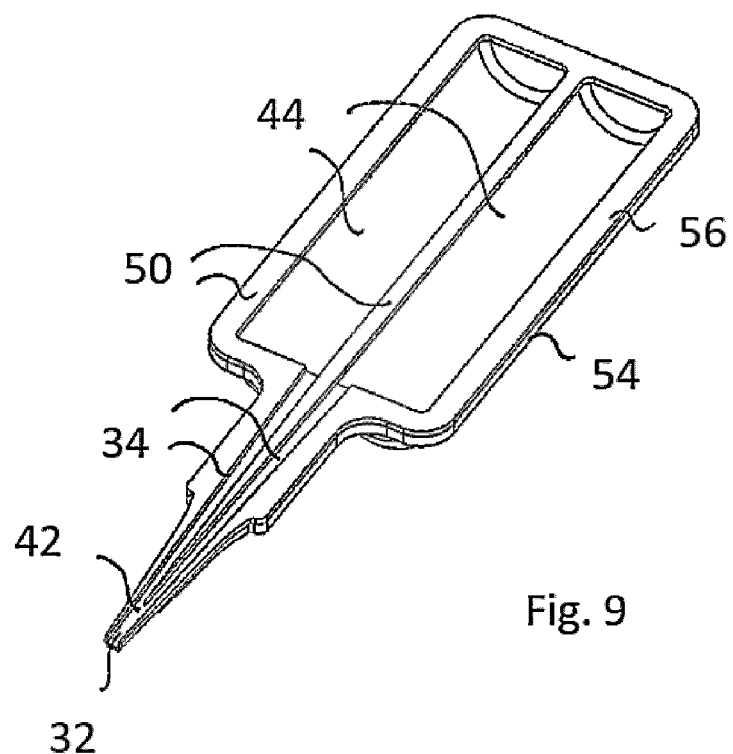
Figure 10:
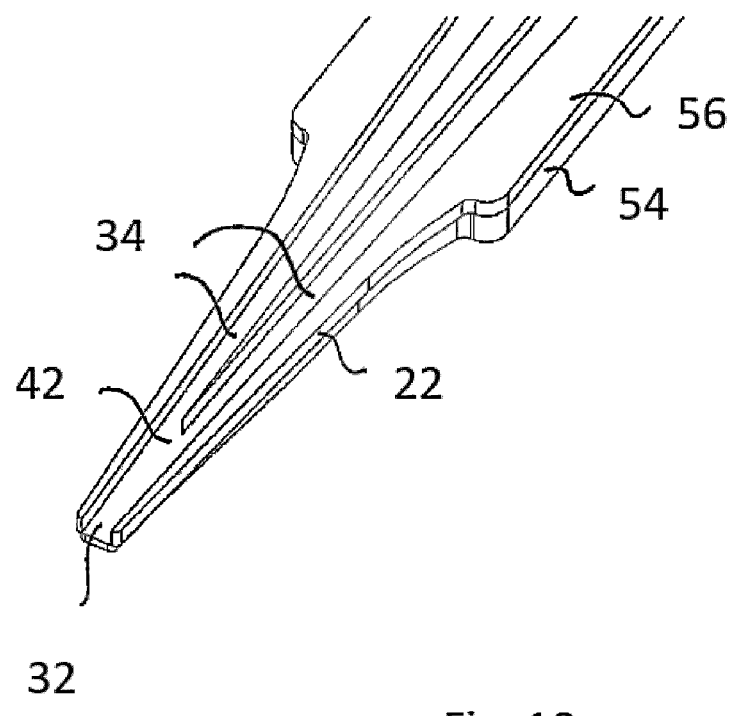
Figure 11:
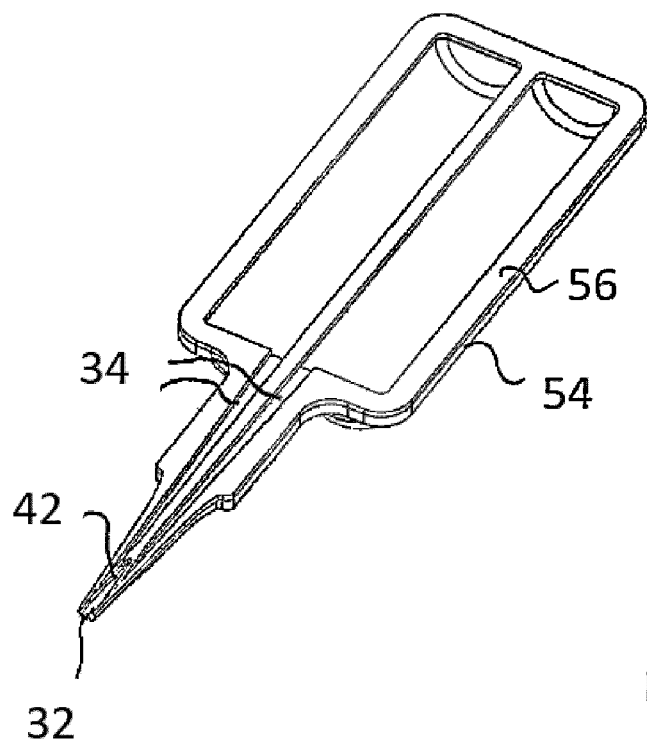
Figure 12:
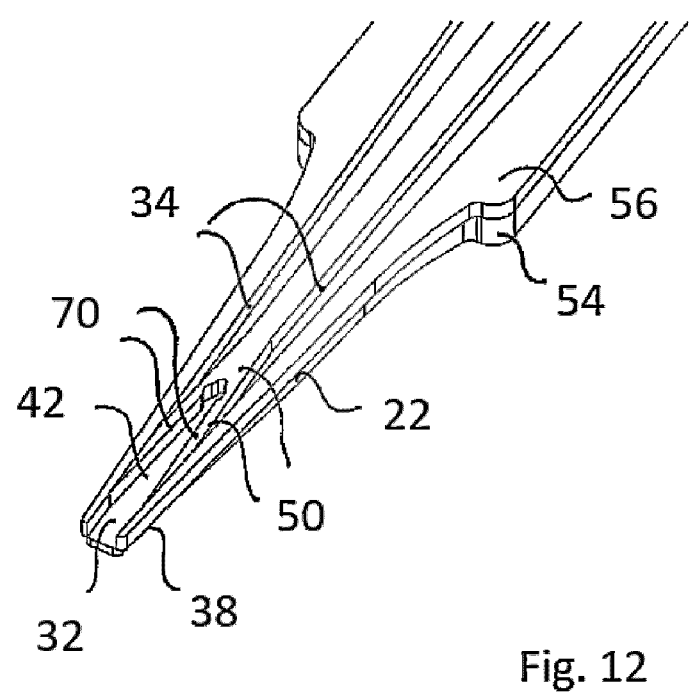
Figure 13:
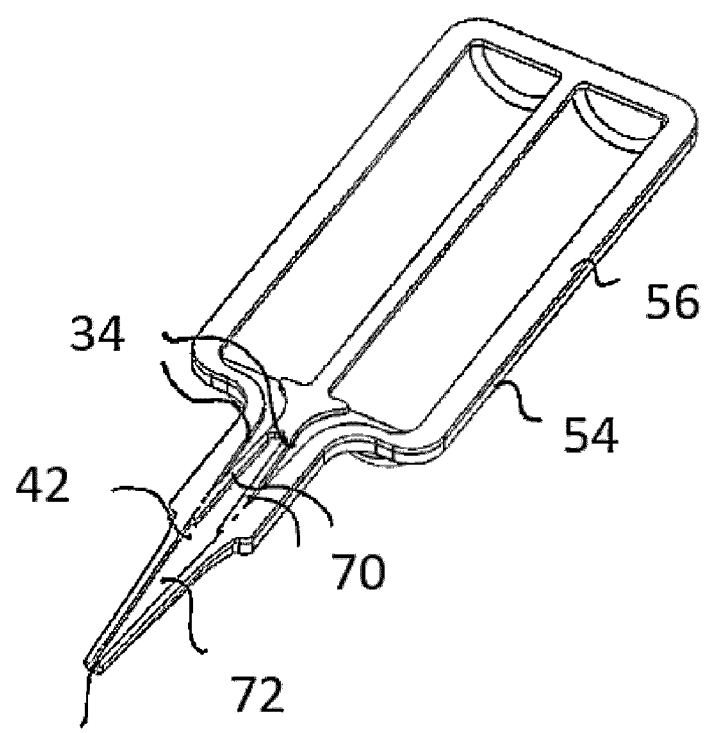
Figure 14:
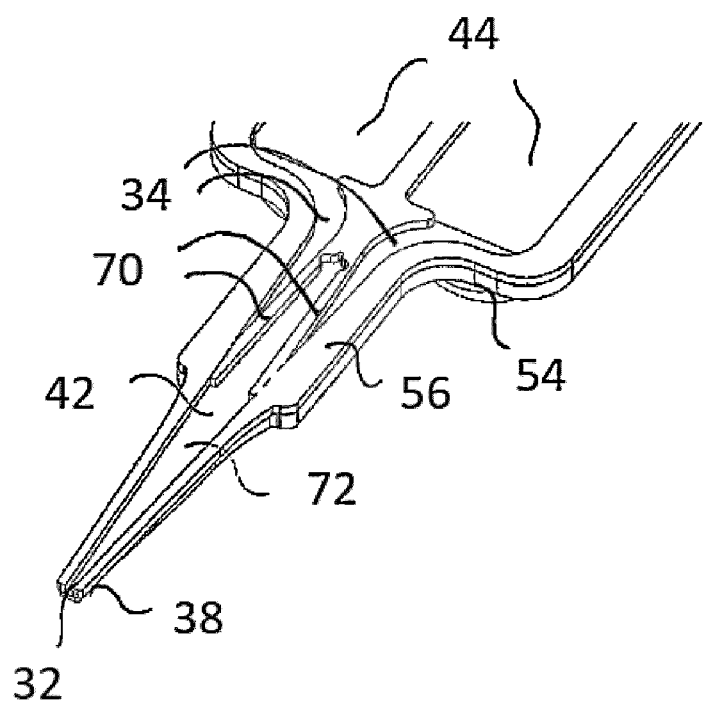
Figure 15:
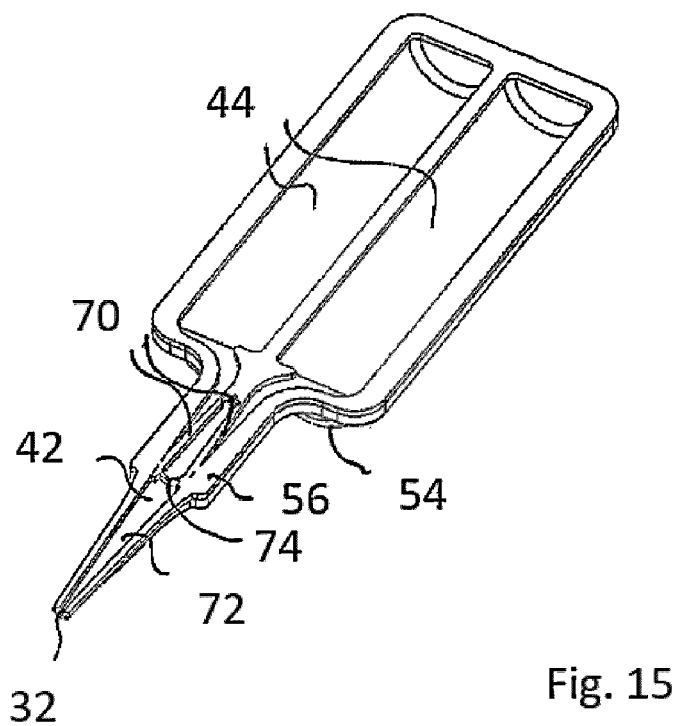
Figure 16:
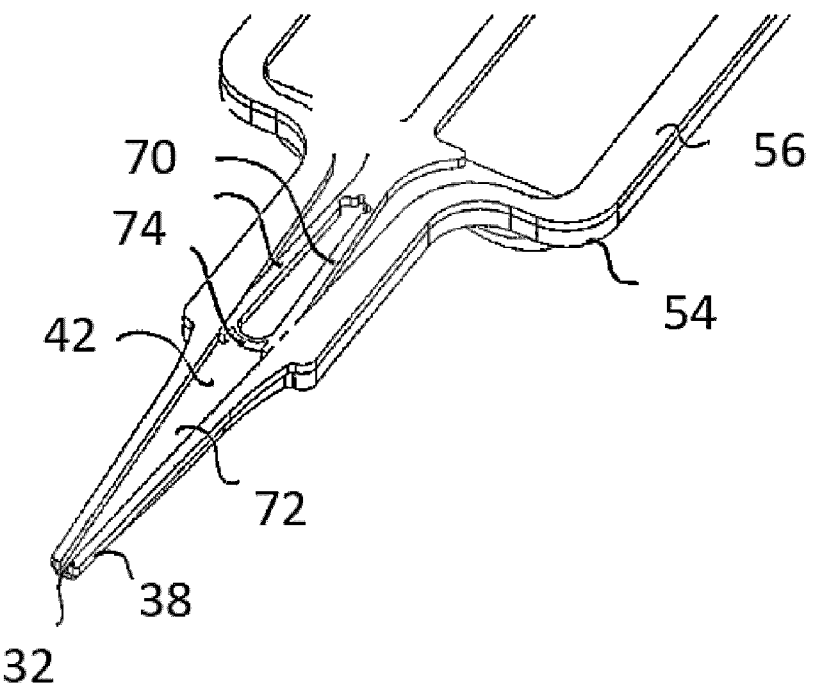
Figure 18A:
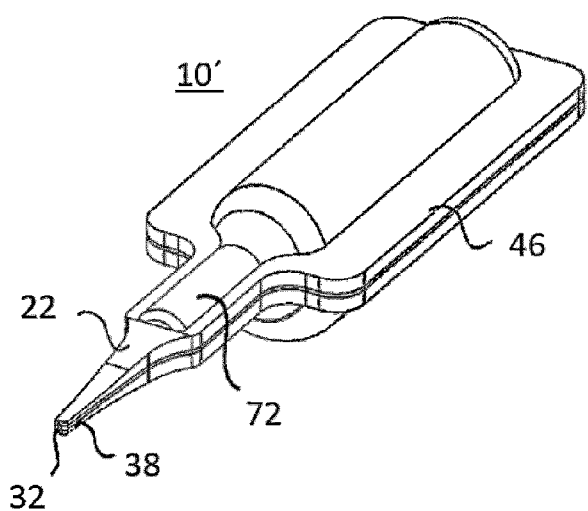
Figure 18B:
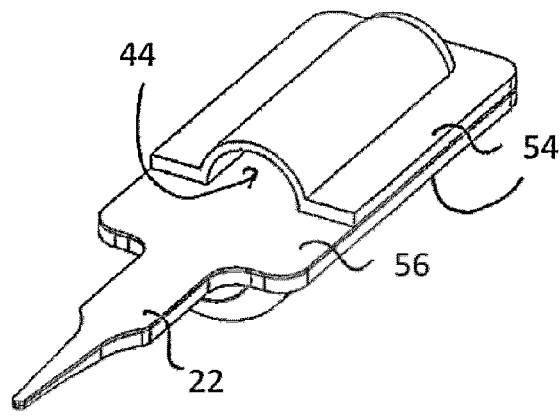
Figure 18C:
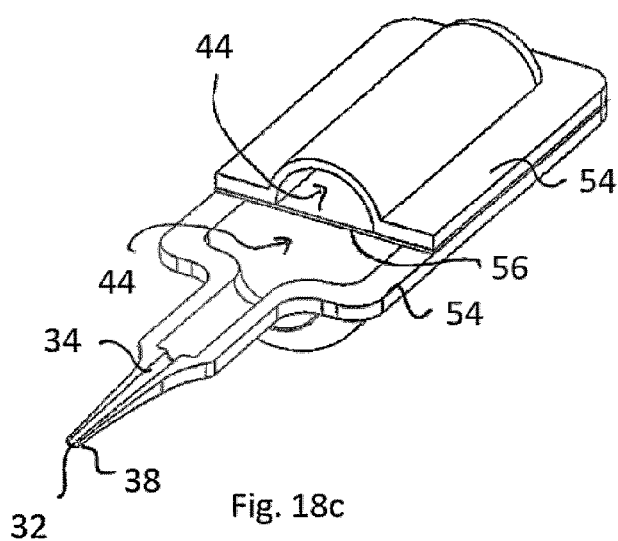
Figure 18D:
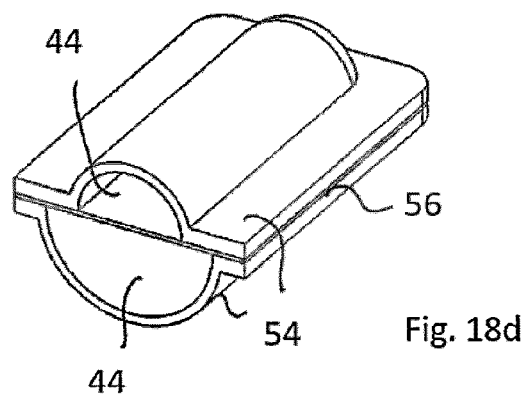
Figure 22A:
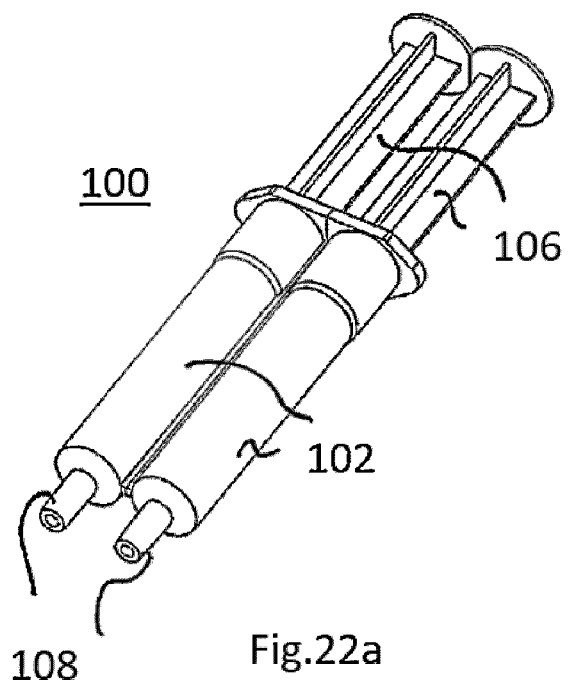
Figure 22B:
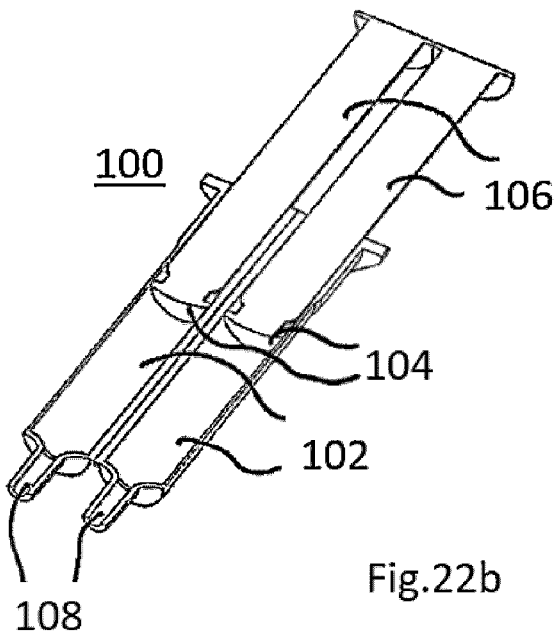
Figure 22C:
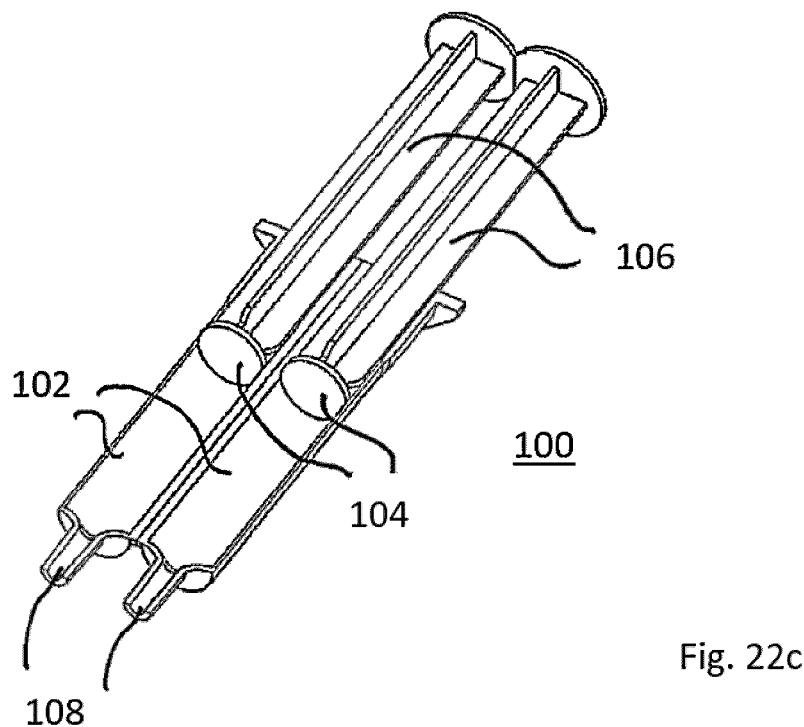
Figure 23A:
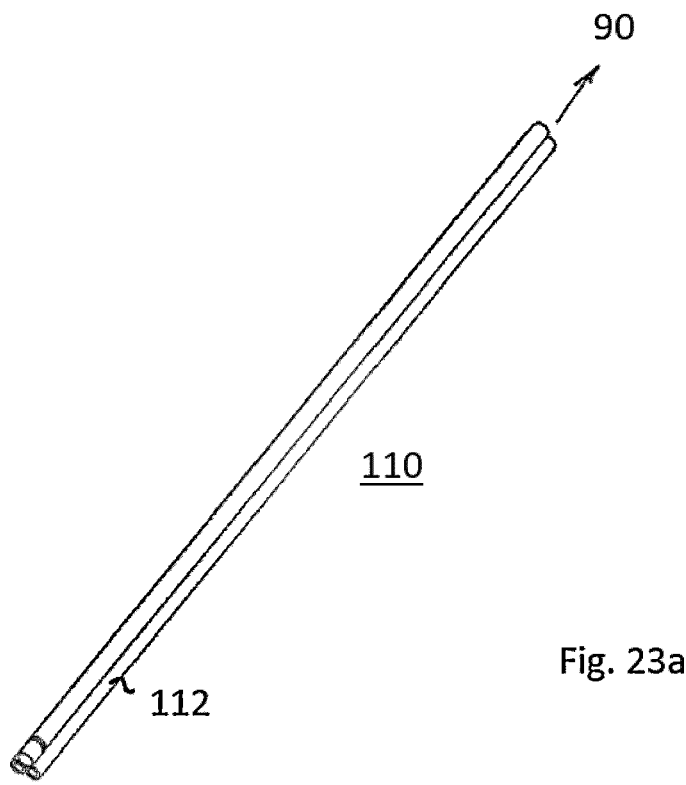

An embodiment of the invention is explained in more detail with reference to a drawing. It shows:

FIG. 1 schematic longitudinal section of a tooth in the oral bone of a patient,

FIG. 2 a schematic of an active ingredient applicator in a multi-part design,

FIG. 3 a perspective view of an application nozzle of the active ingredient applicator according to FIG. 2, FIG. 4 a perspective view of a one-piece active ingredient applicator, FIG. 5 an application nozzle of the active ingredient applicator according to FIG. 2 or FIG. 3 in perspective view of the treatment end and in cross-section, FIG. 6 a perspective view of a base segment of the application nozzle according to FIG. 3 in a sequence of manufacturing steps, FIG. 7 a basal segment of the active ingredient applicator according to FIG. 4, FIG. 8 a sectional enlargement of FIG. 7, FIG. 9 a basal segment of the active ingredient applicator according to FIG. 4 with alternative channel geometry in the area of the mixing point, FIG. 10 a sectional enlargement of FIG. 9, FIG. 11 a basal segment of the active ingredient applicator according to FIG. 4 with further alternative channel geometry in the area of the mixing point, FIG. 12 a sectional enlargement of FIG. 11, FIG. 13 a basal segment of the active ingredient applicator according to FIG. 4 with further alternative channel geometry in the area of the mixing point, FIG. 14 a sectional enlargement of FIG. 13, FIG. 15 a basal segment of the active ingredient applicator according to FIG. 4 with further alternative channel geometry in the area of the mixing point, FIG. 16 a sectional enlargement of FIG. 15, FIG. 17 a variant of the active ingredient applicator according to FIG. 4 in perspective view in different partial sections, FIG. 18 a further variant of the active ingredient applicator according to FIG. 4 in perspective view in different partial sections, FIG. 19 a further variant of the active ingredient applicator according to FIG. 4 in perspective view of a sequence of manufacturing steps, FIG. 20 a perspective view of an intermediate piece in a sequence of manufacturing steps, FIG. 21 the intermediate piece as shown in FIG. 20 with connected media lines, FIG. 22 a double syringe system in different views, FIG. 23 a hose package.

Figures 24A, 24B:
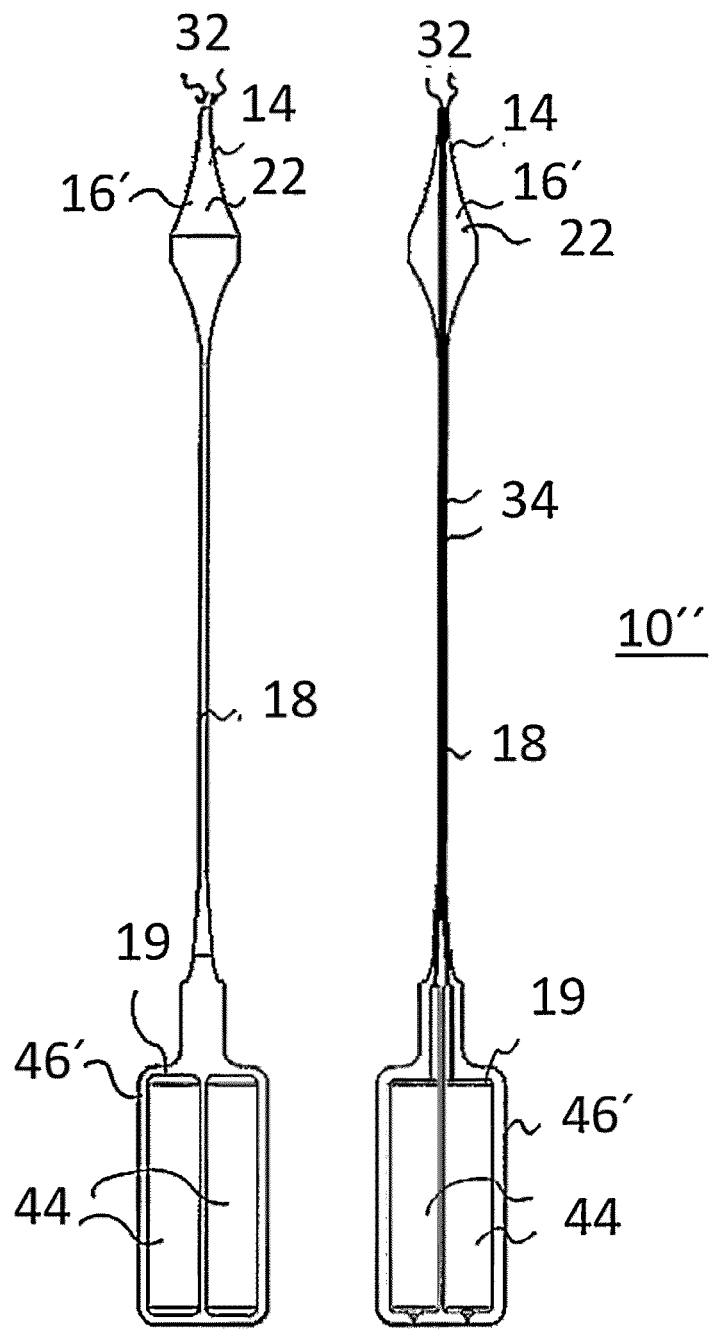
Figure 25:
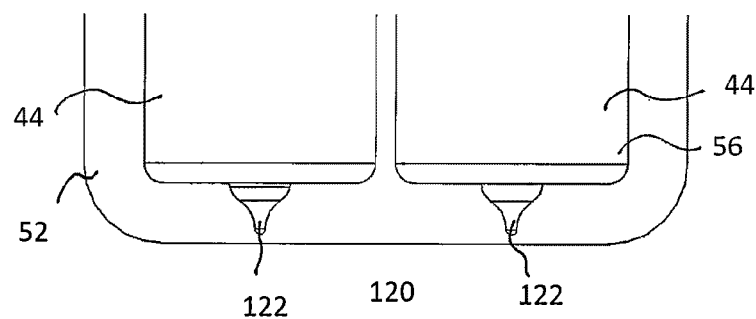
Figure 26:
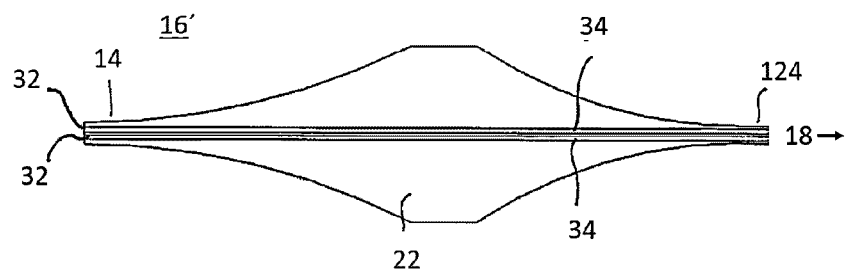
Figure 27:
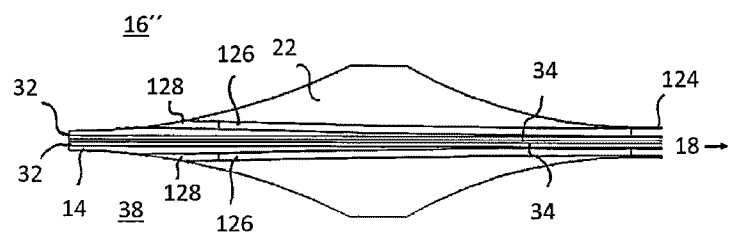
Figure 28:
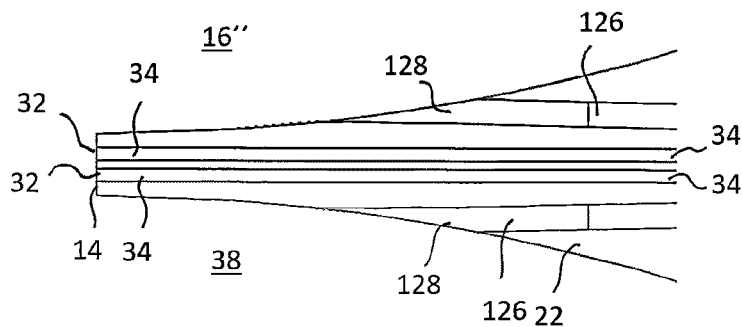
Figures 31A, 31B:
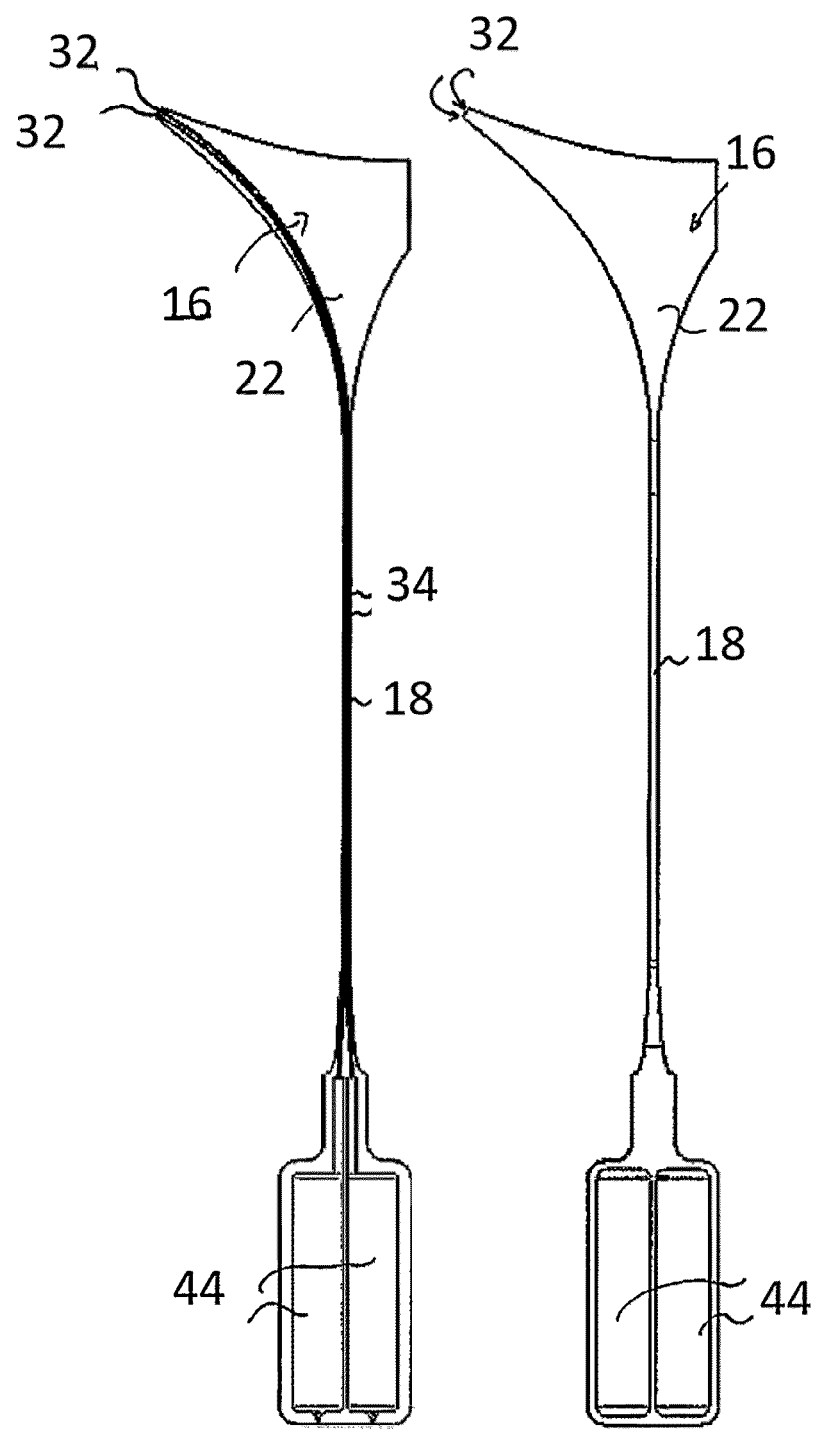

FIG. 24 an alternative embodiment of an active ingredient applicator,

FIG. 25 the bottom area of two active ingredient chambers in longitudinal section, FIG. 26 a longitudinal section of an application nozzle, FIG. 27 an alternative application nozzle in longitudinal section, FIG. 28 an enlarged section of the application nozzle as shown in FIG. 27, FIG. 29 the active ingredient applicator according to FIG. 24 with associated sealing system, FIG. 30 an enlarged view of the closure area of the active ingredient applicator according to FIG. 29, FIG. 31 an active ingredient applicator with beveled application nozzle, and FIG. 32, 33 in each case further alternatively designed active ingredient applicators.

Identical parts are marked with the same reference signs in all figures.

In FIG. 1, a tooth 1 in the jawbone 2 of a patient is shown schematically in longitudinal section. This tooth 1, which serves merely as an example to illustrate the mode of action of the present invention, is shown in the embodiment example in the status after a periodontosis treatment has been carried out, whereby a comparatively deep tooth pocket 6 has formed in the vicinity of the tooth neck 4. This tooth pocket 6 has become inflamed as a result of the periodontal disease due to the penetration of bacteria or germs into the tissue area, in particular in the area of the tooth neck 4 and in the surrounding soft tissue 8. Therefore, after the actual therapeutic treatment of the periodontal disease, a follow-up treatment is provided in the form of aftercare, which may be carried out by the patient himself at home, for example on a daily basis. In this treatment, a dental agent, for example a disinfectant to kill the bacteria or germs present or a rinsing solution, is to be applied precisely in the patient's oral cavity into the tooth pocket 6 and thus the affected area in the surrounding soft tissue.

For this purpose, an active ingredient applicator 10, 10' is provided, shown in FIG. 1 in close proximity to the tooth pocket 6 and in FIG. 2 enlarged in lateral view, which is provided to the patient so that he can carry out the respective treatments himself and from home and apply the intended active ingredient precisely in the oral cavity. It should be noted that the structure and mode of operation of the active ingredient applicator 10, 10' are only described here by way of example with reference to the application of active ingredient into the tooth pocket 6; however, there are of course many other possible uses, for example in the context of (non-therapeutic) dental care or cleaning, for cleaning interdental spaces, for targeted application of active ingredients to local inflammations in the region of the oral cavity or the like, and these are included in the scope of the present invention.

The active ingredient applicator 10 shown in FIG. 2 is designed as a mobile multi-part system in the embodiment example. It comprises a hand or handle piece 12 designed in the manner of a housing, which has an application nozzle 16 at its free or distal end 14 as the actual treatment head or actual treatment element, which in the embodiment example is designed for one-time use only and thus as a disposable product with regard to hygiene and care considerations. The application nozzle 16 is connected via connecting elements, in the embodiment example a piece of tubing 18 guided in a protective sheath 17, to a supply container 19 arranged in the handle 12, in which the intended active ingredients are stored. The hose section 18, together with the protective sleeve 17, is led out of the housing formed by the handle 12 via a feedthrough that can be shut off with a hose valve 11.

Furthermore, a system for actuating the active ingredient container for the automated dispensing of active ingredient, for example a mechanical, pneumatic or hydraulic pressure system 23, with which the active ingredient(s) can be conveyed out, as well as a control unit 20 and a power supply unit 21, for example a battery or rechargeable battery, are arranged in the handle 12. The mechanical system could, for example, be a pressure plunger acting on the active ingredient container or a design similar to a double syringe or double cannula or double cartridge system. In principle, the active ingredient applicator 10 is similar in type and design to an electric toothbrush, whose active (electrical) components are also integrated in the handle forming the outer housing. In the embodiment example, the application nozzle 16 is attached to the fixing piece 15. Alternatively, the active ingredient applicator 10 could also be designed as a stationary application system, for example in the treatment rooms of a dentist; in this case, the handle could for example be designed in several parts and have a mouthpiece which carries the application nozzle 16 and which in turn is connected to a supply system 19 in which the active ingredients are stored.

The application nozzle 16 is shown in FIG. 3 in an enlarged perspective view in a version in which four access nozzles 30 are each connected on the inlet side to a media channel extending within its nozzle body 22. Alternatively, of course, a different number of such access nozzles 30, for example a single one, two or more, can be provided. The application nozzle 16 can, for example, be connected to the hose package 18 via these access nozzles 30.

An alternative, one-piece version of the active ingredient applicator 10' is shown in perspective view in FIG. 4. In this embodiment, the applicator nozzle 16 is an integral part of the active ingredient applicator 10' and is molded onto it. With regard to the intended preferred use in the field of dental care or as a treatment agent also for self-use, the applicator nozzle 16 in both embodiments according to FIGS. 2, 3 and 4 is specifically designed for high functionality with a particularly simple construction, so that production is also possible in enormously high quantities with only limited manufacturing costs. For this purpose, the application nozzle 16 has the nozzle body 22 as an essential functional component, in which a number of media channels 34 for the active ingredient to be applied are arranged, each of which may open into an application opening 32 on the outlet side.

As can be clearly seen from the perspective views in FIGS. 3 and 4, the nozzle body 22 is designed as a body extending in a longitudinal direction from a connection area 36 towards a free treatment end 38. In the one-piece design as shown in FIG. 4, the connection area 36 is located inside the applicator body; in the design as shown in FIG. 3, which is intended for the multi-part variant, the connection area 36 corresponds functionally to the connection side of the application nozzle 16. In the embodiment example, this connection side is provided with suitable means for mechanically fastening the nozzle body 22 to the handle 12 and is connected to the hose piece 18; in the alternatively provided independent embodiment according to FIG. 4, however, such a connection is not necessary.

When shaping the nozzle body 22, particular account is taken of the fact that the user should be able to position the treatment end 38 very precisely despite the very confined space in the oral cavity in order to be able to apply the active substance in a precisely localized manner. In order to make this possible, the spatial shape of the nozzle body 22 is suitably selected, taking into account the fact that the tooth pocket 6 is usually formed in the manner of a gap extending along the tooth surface.

In order to take this into account, according to one aspect of the invention, the nozzle body 22 of the application nozzle 16 is designed as an essentially flat component in the form of a flat spatial body. The application nozzle 16 or the base body 22 forming it is thus designed as a body extending essentially along a basal plane or ground plane, the thickness of which, viewed in cross-section, is kept significantly smaller than its lateral extension in the basal plane. For the application, this means that the free or treatment end 38 of the nozzle body 22 can be inserted into the tooth pockets 6 comparatively easily, for example by aligning the basal plane of the nozzle body 22 essentially parallel to the outer surface of the tooth 1.

Furthermore, the cross-section of the base body 22 tapers towards the treatment end 38. The free or treatment end 38 of the nozzle body 22 thus essentially has a flat, comparatively narrow or even tapered contour, so that insertion into the tooth pockets 6 is particularly easy. In the embodiment example, as can be seen, for example, in the perspective views according to FIGS. 3, 4, this results in the nozzle body 22 having a contour shaped in the manner of a triangle in plan view.

In order to enable precise application of the active ingredient into the tooth pocket 6, the nozzle body 22 is provided with application openings 32 for the respective active ingredient in an outflow area 40 arranged in the area of the treatment end 38, each of which is connected to one of the media channels 34. This allows the respective active ingredient to be applied specifically in the area of the treatment end 38 of the application nozzle 16 and thus, if necessary, directly into the respective tooth pocket 6. A number of the application openings 32 are also arranged in an outflow direction aligned laterally to the longitudinal axis, as can be seen, for example, in the perspective views in FIGS. 3, 4. In this way, the complete spatial area in the tooth pocket 6 around the treatment end 38 of the nozzle body 22 can be flooded with active substance in a simple manner.

With regard to the guidance of the media channels 34 in the nozzle body 22, the present invention basically provides for two preferred design concepts, each of which is considered to be independently inventive.

According to the first of these design concepts, in both embodiments according to FIG. 2 and FIG. 4, the active ingredient applicator 10, 10', in each case by suitable design of the application nozzle 16, is designed according to one aspect of the invention for the concept that two or more active ingredients are applied separately and separately from one another at the application site and are mixed with one another there and brought to react, so that the reaction itself and/or the reaction products can develop an effect at the application site. For this purpose, at least two media channels 34 are integrated into the nozzle body 22, which extend independently of one another from the connection area 36 towards the free treatment end 38 and each open into an application opening 32 on the outlet side. The application openings 32 associated with the two media channels 34 are each spaced about 1 mm apart in the embodiment examples shown, so that the application of the active ingredients can take place sufficiently close to each other at the application site to enable the desired local mixing.

According to the second design concept, which is regarded as independently inventive, on the other hand, in both embodiments according to FIG. 2 and FIG. 4, the active ingredient applicator 10, 10', in each case by suitable configuration of the application nozzle 16, is designed according to one aspect of the invention for the concept that two or more active ingredients are fed separately and distinctly from one another to the nozzle body 22 and are then mixed with one another at a mixing point 42 and thus possibly brought to react with one another. Starting from the mixing point 42, a further media channel 34 then leads to the free treatment end 38, so that the mixed media are applied at the application site. For this purpose, at least two media channels 34 leading independently of one another from the connection area 36 to the mixing point 42 and a further media channel 34 running towards the free treatment end 38 and opening into an application opening 32 on the outlet side are integrated into the nozzle body 22. In addition, further media channels 34 can also be provided, for example leading directly from the connection area 36 to the free treatment end 38, so that further media can also be conveyed directly through the nozzle body 22 to the free treatment end 38, for example in accordance with the first design concept described above. The application openings 32 associated with these media channels 34 are each spaced about 1 mm apart in the embodiment examples shown, so that the active ingredients can be applied sufficiently close to each other at the application site to possibly enable the desired local mixing.

In both design concepts, each media channel 34 extending from the connection area 36 is connected on the input side, for example via the respective access nozzle 30, to a separately assigned active ingredient chamber 44 on the media side. According to one aspect of the invention, the respective active ingredient chamber 44 has an internal volume adapted to the patient dose to be administered, so that no further dosing is necessary for the user.

In the active ingredient applicator 10 according to FIG. 2, the active ingredient chambers 44 are integrated into the supply container, and the media channels 34 individually assigned to each of the active ingredient chambers 44 are routed within the hose section 18 up to the connection area 36. When the active ingredient chambers 44 are pressurized in this embodiment, the active ingredient contained therein is thus transported via the media channels 34 and the application nozzle 16 to the outflow area 40, where it is dispensed via the application openings 32. In contrast, the active ingredient chambers 44 in the active ingredient applicator 10' according to FIG. 4 are integrated into a common base body 46 comprising the nozzle body 22.

In the embodiment example shown, in accordance with an aspect regarded as independently inventive, two active ingredient chambers 44 are provided in each case, in which different active ingredients suitable for the desired effect are provided, which trigger the desired effects in combination or interaction with one another. For example, two active ingredient chambers 44 could be provided, wherein a carbonate, in particular a hydrogen carbonate, is provided in one and an acid (e.g. citric acid) in the other. These are then discharged together, come into contact with each other at the mixing point 42 and react there to form gas and bubbles. This allows a gas under comparatively high pressure to be formed in the mixing point 42, which is then discharged at the treatment end 38 via the media channel 34 downstream of the mixing point 42. This effect could be used particularly favorably for cleaning or rinsing purposes, for example, whereby the gas escaping under high pressure achieves a particularly good cleaning effect.

Alternatively or additionally, a predefined dose of active ingredient, e.g. chlorhexidine for disinfection or a rinsing solution, can be contained in such an active ingredient chamber 44, which is closed with a sealing or closure element after filling to the adjacent media channel 34. The patient can then apply this himself at home, whereby, on the one hand, the design of the application nozzle 16 enables correct positioning in the oral cavity and, on the other hand, the correct dosage of the active ingredient can be ensured by the portioned supply in the nozzle body.

Furthermore, according to one aspect of the invention, at least one of the media channels 34 can be designed as a suction channel in the nozzle body 22 in addition to a media channel 34 provided as an application media channel and opening into an application opening 32 on the outlet side. Such an embodiment comes into consideration in particular in the embodiment shown in FIG. 3 with four access nozzles 30 and correspondingly four media channels running in the nozzle body 22.

Figure 5A:
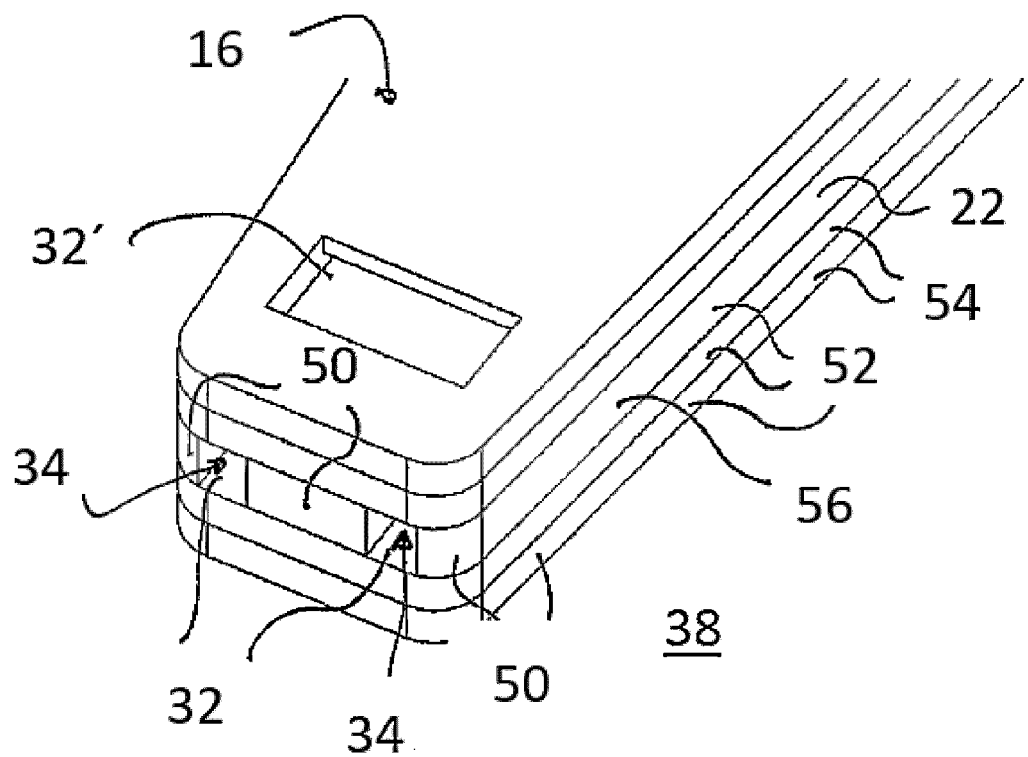
Figure 5B:
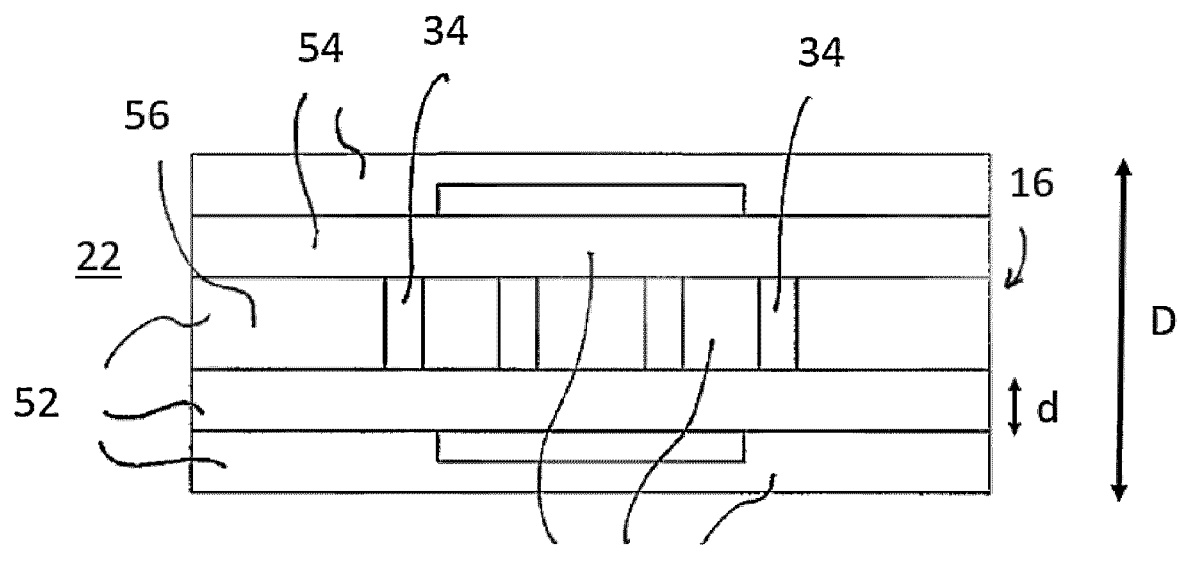

In view of the desired low-cost design suitable for large quantities, according to one aspect of the invention, the nozzle body 22, as is particularly clearly recognizable in the representation of the treatment end 38 in perspective view according to FIG. 5a and in cross-section according to FIG. 5b, is designed in the manner of a laminate body as a layered body constructed from a plurality of pieces of film 50. In FIG. 5a, the treatment end 38 is shown in perspective view; it can be clearly seen that, on the one hand, an application opening 32 is arranged in a substantially straight downstream direction, with laterally aligned application openings 32' also being provided, for example for dispensing a further rinsing medium or also as a suction opening. The underlying layered structure is clearly recognizable in the cross-sectional view according to FIG. 5b. The respective media channels 34 are formed in a film layer 52 of the laminate by a recess made in the respective layer film. Due to this design of the application nozzle 16 or its nozzle body 22 as a composite film body or laminate, suitable application nozzles 16 can be provided cost-effectively and in large quantities by comparatively simple means and with enormous flexibility in the spatial design.

According to one aspect of the invention, this basic design has the considerable advantage that the media channels 34 can be introduced into the respective film layers 52 in a comparatively simple manner and in particular with considerable flexibility with regard to channel routing, geometry and the like by means of conventional film processing methods such as etching, embossing, lasering or the like. This makes it possible to achieve a particularly high degree of flexibility with regard to the geometric and functional design and layout of the media channels 34 in the film stack by simple means. The application nozzle 16 or its nozzle body 22 is formed in the manner of a laminate or stack of layers by a number of pieces of film 50 arranged one above the other and bonded, welded or otherwise connected to one another at their contact surfaces. The pieces of film 50 each have a film thickness d of approximately 150-250 µm and thus within the preferred range of 50-500 µm. The application nozzle 16 or its nozzle body 22 constructed as a laminate of the pieces of film 50 thus has a total thickness D of approximately 0.7-1.2 mm, i.e. within the preferred range of 0.3-2 mm, so that the desired insertion into the tooth pocket 6 is possible without any problems.

According to one aspect of the invention, the one-piece application nozzle 16 shown in FIG. 4 has this construction as a film layer or composite body or as a laminate for the entire nozzle body 22 forming the application nozzle 16. In the embodiment example, the application nozzle 16 is also constructed from foil layers 52, 54, 56 which differ in terms of their material selection and parameters, a central middle foil layer 56 of a first foil material being covered on both sides by a respective side or outer foil layer 52, 54 of a different foil material. The film layer 56 and the film layers 52, 54 differ in their material properties and are functionally adapted to different specifications. In the embodiment example, the central film layer 56 according to one aspect of the invention comprises a comparatively harder film material, i.e. in particular with comparatively greater Shore hardness or modulus of elasticity, the other film layers 52, 54 being rather softer. The central film layer 56 can thus define the contour or spatial shape of the nozzle body 22 in the manner of a support structure, whereas the comparatively softer outer film layers 52, 54 can be designed to be flexible and deformable and thus significantly reduce the risk of injury in the event of contact, for example, of the oral mucosa with the nozzle body 22.

In the embodiment example, the application nozzle 16 shown in FIG. 3 consists in its entirety of such a film composite. This design becomes clear from the representation of the layered sequence of the structure in FIG. 6.

The structure of the film layer package is shown in FIG. 6 by means of a sequence, starting from the first, lowermost film layer 54, with stepwise addition of the further film layers 54, 56. Accordingly, FIG. 6a shows the lowest or first film layer 54, which is already adapted to the desired shape of the nozzle body 22 when viewed from above. Starting from the connection area 36, the width tapers in the direction of the treatment end 38. The piece of film 54, which has already been pre-cut in its outer contour in this way, is also provided with an embossed groove 58, which forms a media channel 34. In the embodiment example shown, this media channel 34 opens into an application opening 32' aligned laterally to the base surface of the nozzle body 22 and is thus particularly suitable as a channel for a rinsing medium, for example.

Figure 6A:
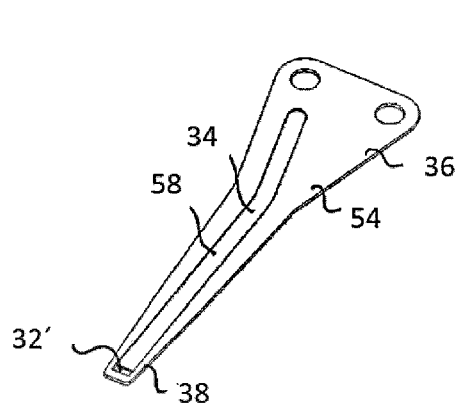
Figure 6B:
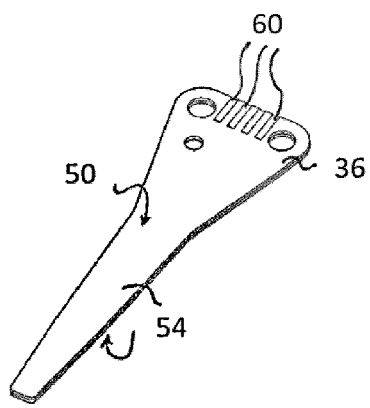

A further piece of film 50, which also forms a film layer 54, is then applied to this lower film layer 54 in the layered structure and laminated on, for example. This resulting film stack is shown in FIG. 6b. This thus comprises two superimposed film layers 54. The last film layer 54 applied covers the media channel 34 previously introduced into the lower film layer 54 and formed by the groove 58 and closes it off at the top. In the connection area 36, the upper film layer 54 is also provided with recesses 60, which define the mounting points for the subsequent attachment of the access nozzles 30.

Figure 6C:
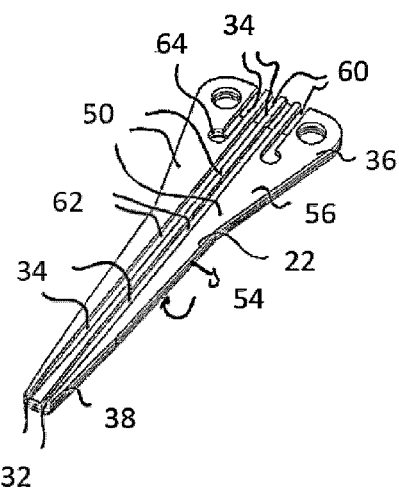

The next film layer 56 is then applied to the resulting layer stack, as shown in FIG. 6c. The film layer 56 forms the central film layer 56 and is made of a comparatively harder film material, i.e. in particular with a comparatively greater Shore hardness or modulus of elasticity, the other film layers 54 being rather softer. The film layer 56 can thus assume the function of a supporting or shaping layer, which gives the entire package a certain rigidity and mechanical stability.

It can be clearly seen in FIG. 6c that the film layer 56 is made in several parts and is formed by a number of pieces of film 50. The foil pieces 50 are arranged at a distance from each other, leaving openings 62 between them. These openings 62 also form some of the media channels 34 integrated in the nozzle body 22, which can be designed with a large degree of freedom due to the possibilities for processing the foils (lasers, punching). In the embodiment example shown in FIG. 6c, it is clearly recognizable that, starting from the connection area 36 provided, four media channels 34 are led into the nozzle body 22 in the example shown there. The two central ones of the media channels 34 are guided separately from each other completely through the nozzle body 22 up to the distal treatment end 38, so that two separate treatment media can be applied independently of each other with these channels 34. In contrast, the two outer media channels 34 are guided within the film layer 56 only as far as a transition point 64, at which they are connected to continuing media channels 34 in the neighboring film layers 54. One of these two media channels 34 is connected, for example, to the media channel 34 in the first film layer 54 already described above.

Figure 6D:
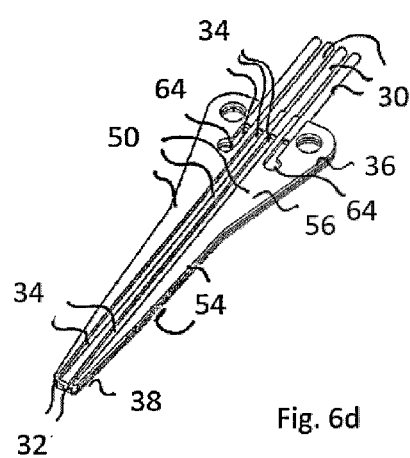
Figure 6E:
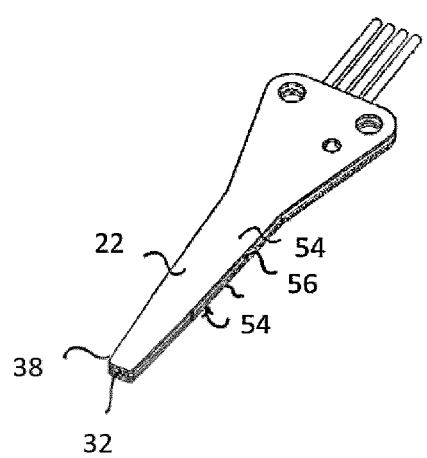
Figure 6F:
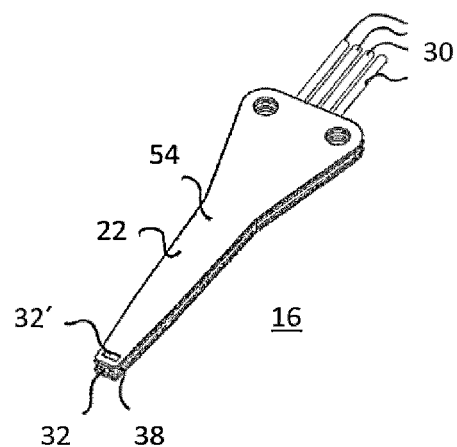

After the central film layer 56 has been applied to the forming film stack, the access nozzles 30 for connecting external media channels or feed lines are inserted into the recesses 60, as shown in FIG. 6d. Subsequently, to complete the application nozzle 16, two further film layers 54 are applied, analogously and symmetrically to the film layers 54 shown in FIGS. 6a and 6b, as shown in FIGS. 6e and 6f are shown. Thus, in the embodiment example shown, the application nozzle 16 is designed as a five-layer film laminate.

Analogous to this construction method, according to one aspect of the invention, this construction method is also provided for the one-piece active ingredient applicator 10' shown in FIG. 4 as a film layered or composite body or as a laminate for the entire base body 46 forming the active ingredient applicator 10'. Accordingly, the latter consists in its entirety of such a film composite, the active ingredient chambers 44 being incorporated directly into the film layers 54 by utilizing the deformability of the latter. This construction method becomes clear from the illustration in FIG. 7. There, the active ingredient applicator 10' is shown in the circumference of its "lower half", i.e. as an ensemble of the lower film layer 54, which forms the active ingredient chambers 44 with its formations, and the central film layer 56. As already explained, the film layer 56 is suitably shaped, for example by lasering or etching, and forms the media channels 34. The outer film layers 54, on the other hand, are suitably expanded in the rear area and form the active ingredient chambers 44 there.

The intended design of the application nozzle 16 and the intended manufacturing process, in particular laser cutting or punching of the contours for the media channels 34, allows enormous flexibility in the design and configuration of the cavities, cavities or media volumes provided in the layer package or laminate. The active ingredient held in the respective active ingredient chamber 44 can then be dispensed by pressing on the composite body, utilizing the material-related deformability of the film composite body, whereby the active ingredient is pressed out through the respective media channel 34 and the associated application opening 32. Polyamide is provided as the base material for the film layers 52, 54, 56 or film pieces 50; alternatively, however, another suitable film material such as PP or PE or also a combination of different film materials can be regarded as favorable.

In the following, some aspects of the invention that are considered to be independently inventive are explained further. These largely concern the channel guide or further elements in the region of the middle or central film layer 56. They are therefore explained with reference to a representation comparable to FIG. 7, i.e. with reference to the embodiment of the one-piece active ingredient applicator 10' shown in FIG. 4; however, these aspects can of course also be used for the variant of the application nozzle 16 shown in FIG. 3.

Figure 7A:
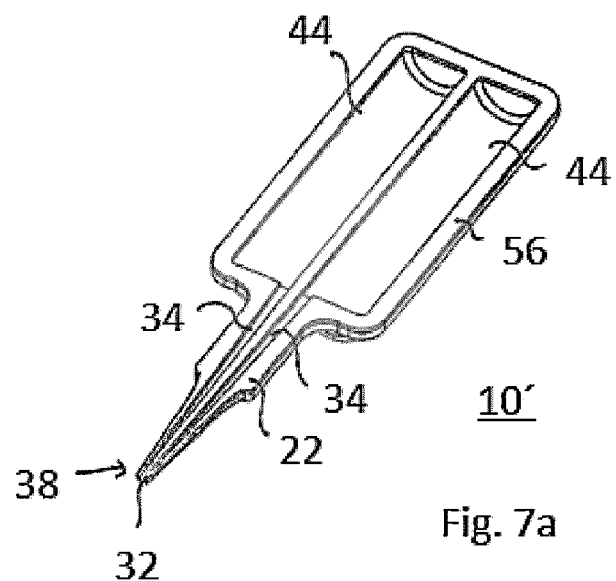

Thus, according to one aspect of the invention and in the sense of the first of the above-mentioned design concepts, as can be clearly seen from the representation in FIG. 7a and in particular from the enlarged representation in FIG. 8a, provision is made for arranging within the film composite in the film layer 56 two media channels 34 as channels which are kept separate from one another on the media side and which, in the region of the treatment end 38, open into two application openings 32 which are arranged close together but separately and at a distance from one another.

Figure 7B:
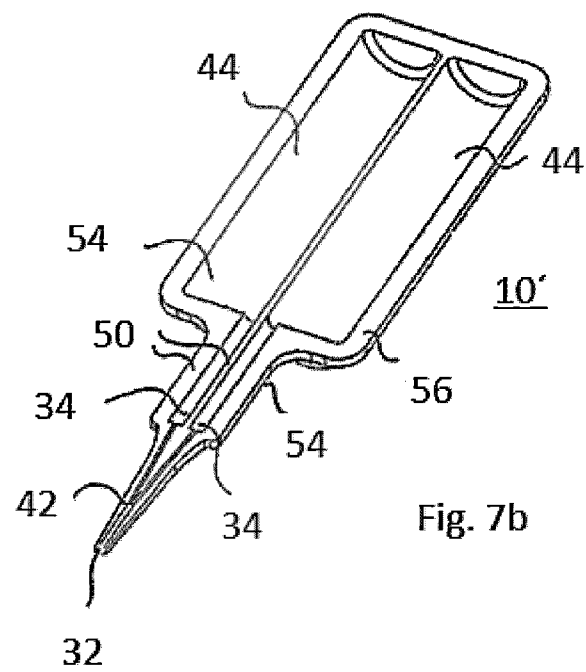

On the other hand, according to a further aspect of the invention which is regarded as independently inventive, as can be clearly seen from the representation in FIG. 7b and in particular from the enlarged representation in FIG. 8b, it is intended to provide a mixing point 42 for two different active substances within the film composite. For this purpose, in this variant, two media channels 34 are designed in the film layer 56 as feed channels which are kept separate from one another on the media side and which are brought together in the mixing point 42.

For example, and according to one aspect of the invention, the active ingredient could be a hydrogen carbonate, preferably potassium, sodium or calcium hydrogen carbonate, particularly preferably sodium hydrogen carbonate, on the one hand, and an acid/carboxylic acid (e.g. malic acid, citric acid, lactic acid, etc.) on the other hand, preferably each in aqueous solution and in a concentration suitable for the intended handling. In accordance with the first design concept, these are then discharged separately from one another into the area of the room requiring treatment and, in accordance with the second design concept, are fed together to the mixing point 42, where they come into contact with one another and react to form bubbles ($CO_2$ formation). As a result of this reaction with bubble formation, a very high pressure can be generated in the mixing point 42 without active external influence, so that the medium emerges from the mixing point 42 at a comparatively high pressure and as a result as a directed jet from the downstream application opening 32 of the nozzle body 22. This effect could be used particularly favorably for cleaning or rinsing purposes, for example, whereby the generation of a directed jet under high pressure is particularly useful.

FIG. 9 and the sectional enlargement in FIG. 10 show the base segment of the active ingredient applicator 10' with alternative channel geometry and channel guidance in the area of the mixing point 42.

A further aspect of the invention which is considered to be independently inventive is shown by means of the representation of the basal segment in FIG. 11 and its enlarged representation in FIG. 12. In this embodiment, two media channels 34 are also integrated into the film layer 56, which are brought together in the mixing point 42. Here, however, valve flaps 70 are connected in the media channels 34 shortly before the contact point to the mixing point 42. In the embodiment example, these are pieces of film 50 molded into the film layer 56, which basically close the respective media channel upstream of the mixing point 42 in the manner of a spring or leaf spring valve, but can be displaced by the media pressure in the respective media channel 34 and thus open the channel. However, this is not possible in the opposite direction, since in the event of increased pressure in the area of the mixing point 42, the valve flaps 70 are pressed into their valve seat at the edge of the respective media channel 34 and thus close it tightly. Due to such a valve arrangement, in an embodiment which is regarded as independently inventive, a backflow of the media mixture produced in the mixing point 42 into the feed media channels 34 is excluded, so that particularly in the case of the intended pressure increase after the mixing of the active ingredients, the discharge of the gas which forms only takes place in the direction towards the treatment end 38, i.e. via the application opening 32.

A further variant of the invention, which is also regarded as independently inventive, is shown by means of the representation of the basal segment in FIG. 13 and its enlarged representation in FIG. 14. In this variant, too, valve flaps 70 are incorporated into the film layer 56 in accordance with the functionality described above. In this variant, however, the geometry is designed in such a way that a mixing chamber 72 is formed in the region of the mixing point 42. This provides a sufficient volume for the expected gas formation, particularly for the intended mixing of active ingredients.

In the further embodiment shown in FIG. 15 (enlarged in FIG. 16), which is otherwise identical in construction to the variant described above, an additional spring element 74 is provided in an embodiment which is regarded as independently inventive, which acts on the valve flaps 70 and reinforces their restoring or contact pressure forces on their valve seats.

In the following, some aspects considered to be inventive with respect to the configuration of the active ingredient chambers 44 of the active ingredient applicator 10' according to FIG. 4 are explained in more detail. For this purpose, sections or half-sections of the perspective view analogous to FIG. 4 are shown in part, without going into more detail about the channel routing within the central film layer 56. However, the above explanations of the channel guide can also be provided in full in the following examples.

The active ingredient applicator 10' shown in FIG. 17 in perspective and in different partial sections has two active ingredient chambers 44, which are arranged on both sides of the central film layer 56 and are separated from the latter. This means that different active ingredients can easily be stored in the two active ingredient chambers 44. Furthermore, it is clearly recognizable in FIG. 17a that the mixing chamber 72 is formed in the area of the uppermost film layer 54 shown by suitable shaping. Due to the shaping shown in the film material, the volume of the mixing chamber 72 can be adapted to the intended purpose and the expected requirements for the intended gas formation and the associated pressure build-up, in particular in an embodiment considered to be independently inventive; in the embodiment example, the mixing chamber is designed for a volume of about 100 $mm^{(3)}$.

In the further variant shown in FIG. 18, which is otherwise identical in construction, the active ingredient applicator 10' has active ingredient chambers 44 with different internal volumes. This allows the active ingredients to be stored in the active ingredient chambers 44, for example, in suitably selected and adapted quantities with regard to the intended reaction. Also in this variant, the mixing chamber 72 is formed by a corresponding shaping in the uppermost layer film 54 with a suitably selected volume.

A further variant of the active ingredient applicator 10', which is regarded as independently inventive, is shown in FIG. 19 by means of a sequence, starting from the first, lowermost film layer 54, with stepwise addition of the further film layers 54, 56. Accordingly, FIG. 19a shows the lowest or first film layer 54, which is already adapted to the desired shape of the nozzle body 22 in its treatment area as seen in plan view. Furthermore, the active ingredient chamber 44 is already incorporated into this film layer 54, in accordance with the embodiments described above. The piece of foil 54 is also provided with an embossed groove 58, which forms a media channel 34 and is guided only over a partial area up to the distal or treatment end 38 of the applicator.

A further piece of film 50, also forming a film layer 54, is then applied to this lower film layer 54 during the layer-by-layer assembly and laminated on, for example. This resulting film stack is shown in FIG. 19b. This thus comprises two superimposed film layers 54. The film layer 54 applied last covers the media channel 34 previously introduced into the lower film layer 54 and formed by the groove 58 and basically closes it off at the top. In a transition region 76, which in its position largely overlaps with the end region of the media channel 34 guided in the lower film layer 54, the upper film layer is provided with a valve flap 78, which can be formed, for example, by introducing an opening line 80, e.g. by lasering or punching. The valve flap 78 allows the medium guided in the media channel 34 in the lower film layer 54 to pass upwards, i.e. into the next following upper film layer 56.

This is applied to the resulting layer package, as shown in FIG. 19c, and is designed as a central film layer 56 according to the criteria explained above. The film layer 56 can thus assume the function of a supporting or shaping layer, which gives the entire package a certain rigidity and mechanical stability.

It can be clearly seen in FIG. 19c that the central film layer 56 is provided with a recess in an area above the aforementioned valve flap 78, which forms the mixing chamber 72. Subsequently, to complete the active ingredient applicator 10', two further film layers 54 are applied, analogously and symmetrically to the film layers 54 shown in FIGS. 19a and 19b, as shown in FIGS. 19d and 19e are shown. Thus, in the embodiment example shown, the active ingredient applicator 10' is designed as a five-layer film laminate and is suitably designed for mixing the active ingredient chambers 44 arranged on both sides of the central film layer 56 in the mixing chamber 72 in the central film layer 56.

Alternatively, and in a manner regarded as independently inventive, the nozzle body 22, in an otherwise largely identical design to that described above, can also be designed as an intermediate piece 90 instead of an application nozzle 16, in which the introduction of the media into the oral cavity of the patient does not take place via application openings 32 arranged at the treatment end of the nozzle body 22, but via an independent application part 92, for example a hose package, a treatment snorkel or the like. In such an embodiment, the actual delivery part 92 can be suitably connected to the outlet area of the nozzle body 22, whereby a pressurized treatment medium generated in the mixing point 42 or in particular in the mixing chamber 72 can be directed to the intended delivery location in the patient's oral cavity via a corresponding pressure line 94 provided in the delivery part 92. Accordingly, suitable further media channels 34 can be provided in the delivery part 92 for further media guided in the nozzle body 22, such as individual media, which are only to be brought into contact with one another at the delivery point in the oral cavity of the patient.

As can be clearly seen in FIG. 20g, FIG. 20h, the mixing chamber 72 is also created in one of the upper film layers 54 in this embodiment and is formed in the outermost film layer 54 by suitable shaping and defined in its volume.

Such an intermediate piece 90, which is regarded as independently inventive, is shown in FIG. 20 by means of a sequence of manufacturing steps. Any of the components and elements described above can be provided analogously for the design of the intermediate piece 90. The intermediate piece 90 connected on the input and output side with corresponding media lines, on the other hand, is shown in FIG. 21.

On the input side, the intermediate piece 90 can be connected via the media supply line 96 to suitable containers for the respective active ingredients provided, whereby, for example, conventional cartridges or also active ingredient containers of the type described above could be provided. However, in a manner regarded as independently inventive, a double syringe system 100 can also be provided for introducing the active ingredient, as shown in FIG. 22 in perspective view (FIG. 22a), in longitudinal section (FIG. 22b) and in partial section (FIG. 22c). In a conventional embodiment, the double syringe system 100 comprises two syringe bodies 102 connected functionally in parallel, each of which forms an active ingredient chamber and in each of which a syringe plunger 104 is guided. The tip plungers 104 are each driven by an actuating plunger 106, the actuating plungers 106 being coupled to one another in the example of the embodiment shown. During actuation, which can be carried out manually or also automatically in a corresponding supply system, the active ingredients held in the syringe bodies 102 are thus simultaneously discharged via the respective connection nozzles 108 and supplied to the intermediate piece 90 via the connected media supply line 96.

On the output side, the intermediate piece 90 is connected to an output part 92 as mentioned. This can, as shown as an example in FIG. 23, be designed as a hose package 110. The hose package 110 comprises a number of, in the embodiment example two, active ingredient hoses 112, each of which opens at the end into an application opening 114. The respective active ingredient can thus be delivered directly and precisely to the desired application site via these. Furthermore, the hose package 110 also comprises a pressure hose 116, which is connected on the inlet side to the mixing chamber 72 of the intermediate piece 90. Thus, as soon as a gas under increased pressure is generated as a reaction product in the mixing chamber 72 by selective mixing of two starting substances according to one aspect of the invention, this gas can be discharged via the pressure hose 116 and applied via its outlet opening 118.

Figure 23B:
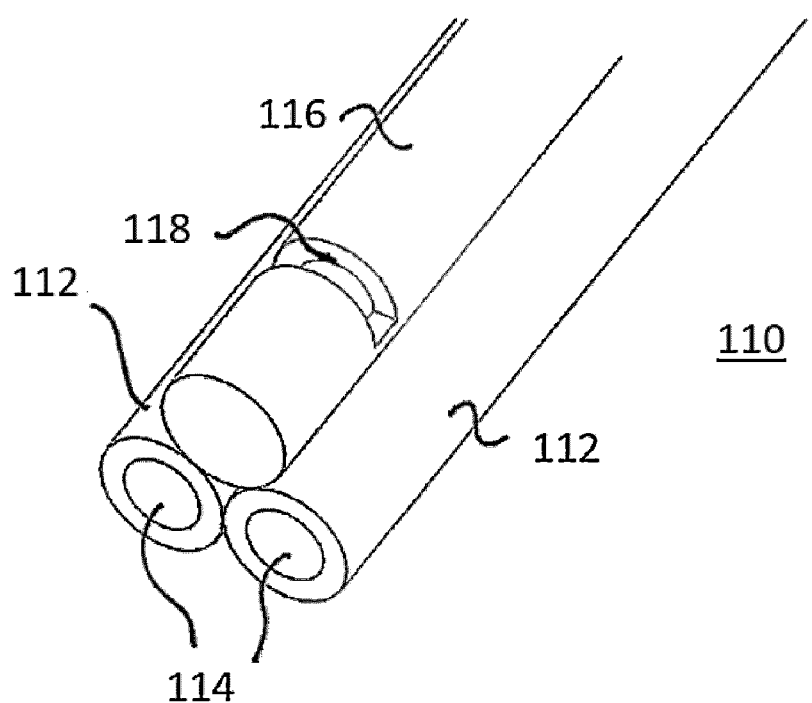

As can be clearly seen from the enlarged representation in FIG. 23b, the outlet opening 118 for the pressurized gas generated is designed for a lateral outflow direction, so that, for example, during dental treatment, cleaning can be carried out specifically in a lateral direction.

According to one aspect of the invention, the intermediate piece 90 can thus be connectable on the inlet side to a double syringe 100 of the type shown, to a double cartridge syringe or to any other suitable active ingredient chambers. Depending on requirements and use according to design, it can have valves, in particular in the manner of the valve flaps 70, 78 described, a mixing or reaction chamber 72 of the type described above or a combination thereof; it is thus suitable for having a rinsing outlet and/or a pressure outlet as required. On the input side, it can have a suitable number of media inputs, in particular two or four inputs, depending on the individual design. The intermediate piece 90 can be located in particular between the ampoules/the ampoule system and the application part. It comprises, for example, a pure combination of two media channels (e.g.: aqueous solution of carboxylic acid and aqueous solution of a hydrogen carbonate). In this function, it acts as a simple Y-piece and contains at least one outlet. The desired active function is a non-directional pressure release for flushing.

Alternatively, the intermediate piece 90 can serve to combine media, directly or indirectly flowing into a mixing or reaction chamber 72, whereby it comprises at least one media outlet. The desired active function in this case is a directed pressure release, preferably for cleaning a contaminated surface and for rinsing.

Both of the above intermediate piece functions can be designed with or without non-return valves. In a particularly favorable design of the intermediate piece, the aforementioned active functions and designs are provided in combination.

The intermediate piece 90 can also be supplied jointly with at least two ampoules in an embodiment according to the aforementioned design, which are brought together on the media side in the intermediate piece 90. In a further embodiment, however, the active functions can also be provided individually by at least two ampoules.

The intermediate piece 90 can also be in one piece with the ampoule part and/or the applicator part.

An alternative embodiment of an active ingredient applicator 10" is shown in FIG. 24 both in plan view (FIG. 24a) and in longitudinal section (FIG. 24b). Analogous to the embodiment according to FIG. 4, this has a base body 46' in which the two active ingredient chambers 44 are integrated.

These are connected on the media side via a piece of tubing 18, which can be comparatively long in view of the intended treatment methods, to the application nozzle 16' arranged at the distal end 14 and formed by the nozzle body 22. The at least two media channels 34 provided for the media-side connection of the active ingredient chambers 44 with the application openings 32 on the application nozzle 16' are arranged integrated in the nozzle body 22 as described above and are continued from this inside the hose piece 18 as far as the active ingredient chambers 44. The active ingredient applicator 10" shown here can be designed in one piece analogous to the aforementioned example and as such can be intended for direct use or also as a filling for the active ingredient applicator 10 according to FIG. 2. Alternatively, the active ingredient applicator 10" can also be designed in several pieces, whereby, for example, the hose piece 18 could be connected via suitable connections to a separately designed application nozzle 16' and/or to a separately designed supply container 19.

According to one aspect of the invention, the active ingredient chambers 44 in the examples explained above can be formed by moldings in the respective film layers 52, 54, 56. Filling with active ingredient can then take place, for example, by injecting the active ingredient between the pre-laminated film layers 52, 54, 56, which may be further deformed in the process and thus form the actual active ingredient chamber 44. Subsequently, i.e. after complete filling with active ingredient, the film layers 52, 54, 56 can be suitably welded and/or sealed. The bottom area of the respective active ingredient chamber 44 with the respective appropriately welded or sealed filling opening 122 is shown in longitudinal section in FIG. 25.

The application nozzle 16' of the active ingredient applicator 10" according to FIG. 24 is shown in FIG. 26 in enlarged longitudinal section. In a connection area 124 for the hose package 18, it initially widens in cross-section towards the distal end 14 until it merges into the actual nozzle body 22, where it tapers again towards the distal end 14 in accordance with an aspect of the present invention. The integrated media channels 34 are guided completely through the segment shown.

FIG. 27 shows a variant of the application nozzle 16" in longitudinal section, which in addition to the two media channels 34 also comprises a number of suction channels 126 as further media channels. Analogous to the media channels 34, these are guided both through the nozzle body 22 and through the hose piece 18 connected thereto and open out in the region of the treatment end 38 in laterally arranged suction openings 128. According to one aspect of the invention, as can be clearly seen from the representation in FIG. 27 and also from the enlarged representation in FIG. 28, the suction channels 126 are designed with a larger internal diameter than the media channels 34; likewise, the suction openings 126 are designed larger than the application openings 32. This takes account of the fact that in the expected treatment method, even the introduction of a comparatively small amount of active ingredient can and should result in a comparatively large suction requirement for the reaction products formed, but also for fragments, food residues and other cleaning products resulting from rinsing or cleaning, due to the intended reaction of the active ingredients with each other at the place of use. However, in a variant not shown here, the suction can also be arranged further away from the application openings 32 or the nozzle body 22. Advantageously, the suction device(s) is/are designed as a kind of bell made of a soft material. In this case, it is possible for this bell to close the tooth pocket 8 from the outside after the application nozzle 16 has been inserted into the tooth pocket 8 in order to be able to suck out the components sponged out of the tooth pocket 8 in a particularly efficient manner.

According to a further aspect which is regarded as independently inventive, the active ingredient chambers 44 are closed towards the associated media channel 32 or also the respective media channel 34 towards the outside by a sealing or closure element 130, so that unintentional leakage of the active ingredient is avoided. In FIG. 29, such a closure element 130 is shown for the example of the active ingredient applicator 10" according to FIG. 24 in longitudinal section (FIG. 29a), in plan view (FIG. 29b) and in lateral view (FIG. 29c); however, this embodiment is of course also suitable for the other variants of the active ingredient applicators 10, 10'. In this case, a tear-off closure element 132 is formed on the treatment end 38 of the nozzle body 22, which suitably closes the outlet-side ends of the media channels 34 and possibly the suction channels 126, i.e. in particular the application openings 32 or the suction openings 128. As can be seen in particular from the enlarged representation in FIG. 30, the closure element 132 is molded onto the outlet region of the nozzle body 22 via a predetermined breaking point 134, in the embodiment example a suitable weakening in the base material. The closure element 132 can be torn off at this predetermined breaking point 134, whereby the application openings 32 and possibly the suction openings 128 are exposed and the media channels 34 or suction channels 126 are made accessible In particular, it can be seen that in the state with the closure element attached, as shown in FIG. 30a, the media channels 34 are closed. FIG. 30b shows the side view of the predetermined breaking point 134, in which it can be seen that the material thickness in the area of the predetermined breaking point 134 is greatly reduced in the form of a type of notch 136. The closed media channels 34 extend beyond the predetermined breaking point 134. If the closure element 132 is now separated from the active ingredient applicator 10''' according to FIG. 24 by pulling or tearing, two application openings 32 are formed at the media channels 34 of the application nozzle 16. The advantage is in particular that the application nozzle 16", which was sterile beforehand, can remain sterile after the media channels 34 have been opened.

The previous examples relate to active ingredient applicators with an essentially straight application nozzle 16. However, this can alternatively also be designed laterally, beveled or curved in order to facilitate handling if necessary. This is shown as an example for the active ingredient applicator 10" in FIG. 31.

According to an aspect regarded as independently inventive, the provision of a hydrogen carbonate as an active ingredient in an active ingredient chamber 44 connected to an application opening 32 via a media channel 34 can in principle also be provided in the context of only one active ingredient chamber 44. An active ingredient applicator 140 constructed in this way, in whose active ingredient chamber 44 a hydrogen carbonate is provided, is shown in FIG. 32 in partial view (FIG. 32a) and in perspective view (FIG. 32b) with the application nozzle aligned in a straight line and in FIG. 33 in partial view (FIG. 33a) and in perspective view (FIG. 33b) with the application nozzle aligned in a curved manner in the lateral direction.

LIST OF REFERENCE SYMBOLS

1 Tooth
2 Jaw bone

4 Tooth neck
6 Tooth pocket
8 Soft tissue
10, 10', 10" Active ingredient applicator
11 Hose valve
12 Handle
14 End
15 Fixing piece
16, 16' Application nozzle
17 Protective cover
18 Hose section
19 Supply container
20 Control unit
21 Power supply unit
22 Nozzle body
23 Mechanical, pneumatic or hydraulic pressure system
30 Access spigot
32 Application opening
34 Media channel
36 Connection side
38 Treatment end
40 Outflow area
42 Mixing point
44 Active ingredient chamber
46, 46' Base body
48 Locking element
50 Foil piece
52, 54, 56 Film layer
58 Groove
60 Recesses
62 Recess
64 Crossover point
70 Valve flaps
72 Mixing chamber
74 Spring element
76 Transition area
78 Valve flap
80 Breakthrough line
90 Intermediate piece
92 Application part
94 Pressure line
96 Media supply line
100 Double syringe system
102 Syringe barrel
104 Syringe plunger
106 Actuating plunger
108 Connection piece
110 Hose package
112 Active ingredient tube
114 Application opening
116 Pressure hose
118 Outlet opening
120 Floor area
122 Filling opening
124 Connection area
126 Suction duct
128 Suction opening
130 End element
132 Locking element
134 Predetermined breaking point
136 Notch
140 Active ingredient applicator
d Film thickness
D Total thickness

The invention claimed is:

1. An application nozzle, for applying a dental active substance in the oral cavity of a patient, having a nozzle body which extends in a longitudinal direction from a connection region towards a free treatment end and in which at least two media channels extending independently of one another from the connection region towards the free treatment end having an outlet side are integrated, the nozzle body being designed as a laminate composed of a plurality of pieces of foil.

2. The application nozzle according to claim 1, the media channels of which each open into an application opening on an outlet side of the nozzle body.

3. The application nozzle according to claim 1, in which application openings at ends of the two media channels are spaced apart from one another by at least 0.01 mm and at most 10 mm, at least 0.1 mm and/or at most 2 mm.

4. The application nozzle according to claim 1, wherein application openings are arranged in an outflow region of the nozzle body arranged in a region of the treatment end.

5. The application nozzle according to claim 1, the at least two media channels of which extend independently of one another from the connection region to a mixing point connecting them on a media side, the mixing point being connected on an outlet side via a further media channel to an application opening provided in an outflow region arranged in a region of the treatment end.

6. The application nozzle according to claim 5, the mixing point of which is designed as a mixing chamber, towards which the media channels extend and into which they open.

7. The application nozzle according to claim 6, the mixing chamber of which has a volume of at most 1000 mm$^3$, preferably of at most 500 mm$^3$, particularly preferably of at most 100 mm$^3$.

8. The application nozzle according to claim 5, with a pressure channel provided in addition to the media channels, also integrated in the nozzle body and connected to the mixing point.

9. The application nozzle according to claim 1, the nozzle body of which extends flat and tapers in its cross-section in the direction of the free treatment end.

10. The application nozzle according to claim 1, the nozzle body of which is formed as a laminate made up of a plurality of pieces of foil.

11. The application nozzle according to claim 10, in which the media channels in a foil layer of the laminate are formed by a recess introduced in the respective layer foil.

12. The application nozzle according to claim 10, the media channels of which are provided with integrated spacers.

13. The application nozzle according to claim 10, the nozzle body of which is constructed from at least three foil layers, wherein a central foil layer arranged between two adjacent foil layers is formed from a harder foil material than the two adjacent foil layers.

14. The application nozzle according to claim 10, the nozzle body of which is constructed from at least three foil layers, in each of which a light guide is integrated.

15. The application nozzle according to claim 1, with a suction channel provided in addition to the media channels and also integrated in the nozzle body.

16. The application nozzle according to claim 1, the nozzle body of which has a contour shaped in the manner of a triangle in plan view.

17. The application nozzle according to claim 1, which is designed as a disposable product.

18. An active substance applicator for applying a dental active substance in the oral cavity of a patient, with an application nozzle according to claim 1, wherein a media channel is connected on a media side to a separately associated active substance chamber.

19. The active substance applicator according to claim 18, in which the active substance chambers are integrated into a common base body comprising the nozzle body.

20. The active ingredient applicator according to claim 18, in which the respective active ingredient chamber has an internal volume adapted to the patient dose to be administered.

21. The active ingredient applicator according to claim 18, wherein one of the active ingredient chambers is filled with malic, citric, or lactic acid.

22. The application nozzle of claim 1 wherein one media channel is integrated on a media side with a separately associated active substance chamber, extending towards the free treatment end, wherein one media channel is connected on the media side to a separately associated active substance chamber, wherein one of the active ingredient chambers is filled with a hydrogen carbonate.

* * * * *